(12) United States Patent
Shin et al.

(10) Patent No.: US 10,364,013 B2
(45) Date of Patent: Jul. 30, 2019

(54) SHIP

(71) Applicant: DAEWOO SHIPBUILDING & MARINE ENGINEERING CO., LTD., Seoul (KR)

(72) Inventors: Hyun Jun Shin, Seoul (KR); Dong Kyu Choi, Seongnam-si (KR); Young Sik Moon, Gwangmyeong-si (KR); Su Kyung An, Gwangmyeong-si (KR); Hyun Min Jang, Seoul (KR); Jae Wook Son, Seoul (KR); Joon Chae Lee, Seoul (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 0 days.

(21) Appl. No.: 15/579,558

(22) PCT Filed: Apr. 5, 2016

(86) PCT No.: PCT/KR2016/003544
§ 371 (c)(1),
(2) Date: Dec. 4, 2017

(87) PCT Pub. No.: WO2016/195232
PCT Pub. Date: Dec. 8, 2016

(65) Prior Publication Data
US 2018/0170503 A1    Jun. 21, 2018

(30) Foreign Application Priority Data

Jun. 2, 2015 (KR) .................. 10-2015-0078142
Sep. 25, 2015 (KR) .................. 10-2015-0136257
Nov. 9, 2015 (KR) .................. 10-2015-0156675

(51) Int. Cl.
F17C 9/02    (2006.01)
B63H 21/38    (2006.01)
(Continued)

(52) U.S. Cl.
CPC ............. *B63H 21/38* (2013.01); *F02M 21/02* (2013.01); *F02M 21/0287* (2013.01); *F17C 6/00* (2013.01);
(Continued)

(58) Field of Classification Search
CPC .. F17C 9/02; F17C 2265/03; F17C 2265/031; F17C 2265/032; F17C 2265/033;
(Continued)

(56) References Cited

U.S. PATENT DOCUMENTS 6,220,053 B1 * 4/2001 Hass, Jr. ................ F25J 1/0015
62/613
6,901,762 B2 * 6/2005 Irie ........................ F17C 1/002
62/48.2
(Continued)

FOREIGN PATENT DOCUMENTS

CN    1820163 A    8/2006
CN    101915494 A    12/2010
(Continued)

OTHER PUBLICATIONS

WO2016126025 Translation (Year: 2016).*
(Continued)

*Primary Examiner* — Brian M King
(74) *Attorney, Agent, or Firm* — Knobbe Martens Olson & Bear LLP

(57) ABSTRACT

A ship including a storage tank for storing a liquefied gas includes: a boil-off gas (BOG) heat exchanger installed on a downstream of a storage tank and heat-exchanges a compressed BOG ("a first fluid") by a BOG discharged from the
(Continued)

storage tank as a refrigerant, to cool the BOG; a compressor installed on a downstream of the BOG heat exchanger and compresses a part of the BOG discharged from the storage tank; an extra compressor installed on a downstream of the BOG heat exchanger and in parallel with the compressor and compresses the other part of the BOG discharged from the storage tank; a refrigerant heat exchanger which additionally cools the first fluid cooled by the BOG heat exchanger; and a refrigerant decompressing device which expands a second fluid sent to the refrigerant heat exchanger, and then sends the second fluid back to the refrigerant heat exchanger.

9 Claims, 8 Drawing Sheets

(51) Int. Cl.
| | | |
|---|---|---|
| *F02M 21/02* | (2006.01) | |
| *F17C 6/00* | (2006.01) | |
| *F25J 1/00* | (2006.01) | |
| *F25J 1/02* | (2006.01) | |
| *B63B 25/16* | (2006.01) | |

(52) U.S. Cl.
CPC ............... *F17C 9/02* (2013.01); *F25J 1/004* (2013.01); *F25J 1/0025* (2013.01); *F25J 1/0037* (2013.01); *F25J 1/0202* (2013.01); *F25J 1/023* (2013.01); *F25J 1/0277* (2013.01); *F25J 1/0294* (2013.01); *B63B 25/16* (2013.01); *F02M 21/0215* (2013.01); *F17C 2221/033* (2013.01); *F17C 2227/0185* (2013.01); *F17C 2227/0339* (2013.01); *F17C 2227/0358* (2013.01); *F17C 2265/017* (2013.01); *F17C 2265/03* (2013.01); *F17C 2265/033* (2013.01); *F17C 2265/036* (2013.01); *F17C 2265/037* (2013.01); *F17C 2265/038* (2013.01); *F17C 2265/066* (2013.01); *F17C 2270/0105* (2013.01); *Y02T 10/32* (2013.01)

(58) Field of Classification Search
CPC .. F17C 2265/034; F25J 1/0025; F25J 1/0201; F25J 1/0202; F25J 1/0035; F25J 1/0037; F25J 2210/90; F25J 2245/90
See application file for complete search history.

(56) References Cited

U.S. PATENT DOCUMENTS

| | | | |
|---|---|---|---|
| 2004/0068993 A1 | 4/2004 | Irie et al. | |
| 2011/0056238 A1* | 3/2011 | Mak | F17C 9/04 62/614 |
| 2011/0056328 A1 | 3/2011 | Ko | |
| 2011/0094262 A1 | 4/2011 | Turner et al. | |
| 2012/0036888 A1 | 2/2012 | Vandor | |
| 2014/0202585 A1* | 7/2014 | Barker | F17C 5/06 141/4 |
| 2015/0330574 A1 | 11/2015 | Fuchs et al. | |
| 2016/0114876 A1 | 4/2016 | Lee et al. | |
| 2018/0148138 A1 | 5/2018 | Shin et al. | |
| 2018/0162492 A1 | 6/2018 | An et al. | |
| 2018/0170504 A1 | 6/2018 | Shin et al. | |
| 2018/0170505 A1 | 6/2018 | Shin et al. | |
| 2018/0170506 A1 | 6/2018 | Shin et al. | |
| 2018/0170507 A1 | 6/2018 | Shin et al. | |

FOREIGN PATENT DOCUMENTS

| | | | | |
|---|---|---|---|---|
| CN | 102084114 | A | 6/2011 | |
| CN | 102084171 | A | 6/2011 | |
| CN | 103097237 | A | 5/2013 | |
| CN | 103562536 | A | 2/2014 | |
| EP | 2623414 | A1 | 8/2013 | |
| JP | H11-210993 | A | 8/1999 | |
| JP | 2001-132898 | A | 5/2001 | |
| JP | 3213846 | B2 | 10/2001 | |
| JP | 56-65092 | A | 4/2009 | |
| JP | 2009-079665 | A | 4/2009 | |
| JP | 2010025152 | A | 2/2010 | |
| KR | 10-2006-0123675 | A | 12/2006 | |
| KR | 10-2008-0113046 | A | 12/2008 | |
| KR | 10-2010-0108932 | A | 10/2010 | |
| KR | 10-1153080 | B1 | 6/2012 | |
| KR | 10-2012-0107886 | A | 10/2012 | |
| KR | 10-1194474 | B1 | 10/2012 | |
| KR | 10-1242949 | B1 | 3/2013 | |
| KR | 101242949 | B1 * | 3/2013 | ............. F25J 1/0027 |
| KR | 10-2013-0062006 | A | 6/2013 | |
| KR | 10-1290032 | B1 | 7/2013 | |
| KR | 10-1298623 | B1 | 8/2013 | |
| KR | 10-1310025 | B1 | 9/2013 | |
| KR | 10-2014-0075582 | A | 6/2014 | |
| KR | 10-2014-0107504 | A | 9/2014 | |
| KR | 10-2014-0130092 | A | 11/2014 | |
| KR | 10-2015-0001600 | A | 1/2015 | |
| KR | 10-1488100 | B1 | 1/2015 | |
| KR | 10-1490717 | B1 | 2/2015 | |
| KR | 10-1511214 | B1 | 4/2015 | |
| KR | 10-2015-0049748 | A | 5/2015 | |
| KR | 10-2015-0050113 | A | 5/2015 | |
| WO | 2004/109206 | A1 | 12/2004 | |
| WO | 2009/126604 | A1 | 10/2009 | |
| WO | 2009/136793 | A1 | 11/2009 | |
| WO | 2012/043274 | A1 | 4/2012 | |
| WO | 2012128448 | A1 | 9/2012 | |
| WO | WO-2016126025 | A1 * | 8/2016 | ............. B01D 53/22 |
| WO | 2016/195229 | A1 | 12/2016 | |
| WO | 2016/195230 | A1 | 12/2016 | |
| WO | 2016/195231 | A1 | 12/2016 | |
| WO | 2016/195232 | A1 | 12/2016 | |
| WO | 2016/195233 | A1 | 12/2016 | |
| WO | 2016/195237 | A1 | 12/2016 | |
| WO | 2016/195279 | A1 | 12/2016 | |

OTHER PUBLICATIONS

KR-101242949-B1 Translation (Year: 2013).*
International Search Report dated Jul. 5, 2016 of PCT/KR2016/003544 which is the parent application and its English translation—8 pages.
International Preliminary Report on Patentability of PCT/KR2016/003544 which is the parent application—6 pages.
Office Action in corresponding Korean Patent Application No. 10-2015-0156675—4 pages, (dated Dec. 2, 2015).
Notice of Allowance in corresponding Korean Patent Application No. 10-2015-0156675—6 pages, (dated Jan. 21, 2016).
Search Report & Written Opinion of corresponding Sigaporean Patent Application No. 11201710001X—9 pages (dated Jul. 6, 2018).
Office Action of corresponding Chinese Patent Application No. 2016800455023—11 pages (dated Feb. 2, 2019).
Extended European Search Report of corresponding Patent Application No. 16803587.1—17 pages (dated Feb. 19, 2019).
Office Action in corresponding Chinese Patent Application No. 201680045324.4—7 pages (dated Feb. 1, 2019).
Office Action in corresponding Chinese Patent Application No. 201680045491.9—11pages (dated Feb. 2, 2019).
Office Action in corresponding Chinese Patent Application No. 201680045478.3—9 pages, (dated Feb. 1, 2019).
Partial Supplemental European Search Report in corresponding European Patent Application No. 16803584.8—21 pages (dated Feb. 19, 2019).
Extended European Search Report in corresponding European Patent Application No. 16803585.5—18 pages (dated Feb. 19, 2019).
Extended European Search Report in corresponding European Patent Application No. 16803586.3—16 pages (dated Feb. 19, 2019).

(56) References Cited

OTHER PUBLICATIONS

Extended European Search Report in corresponding European Patent Application No. 16803592.1—10 pages (dated Feb. 19, 2019).

* cited by examiner

[FIG 1]
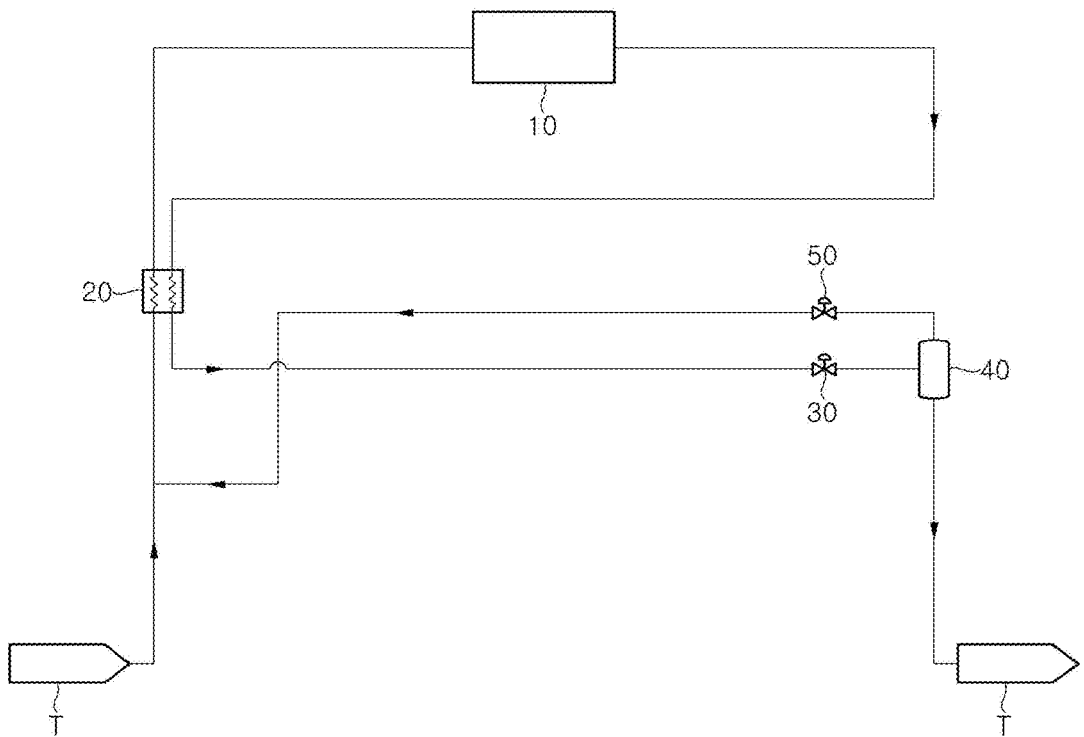

[FIG 2]
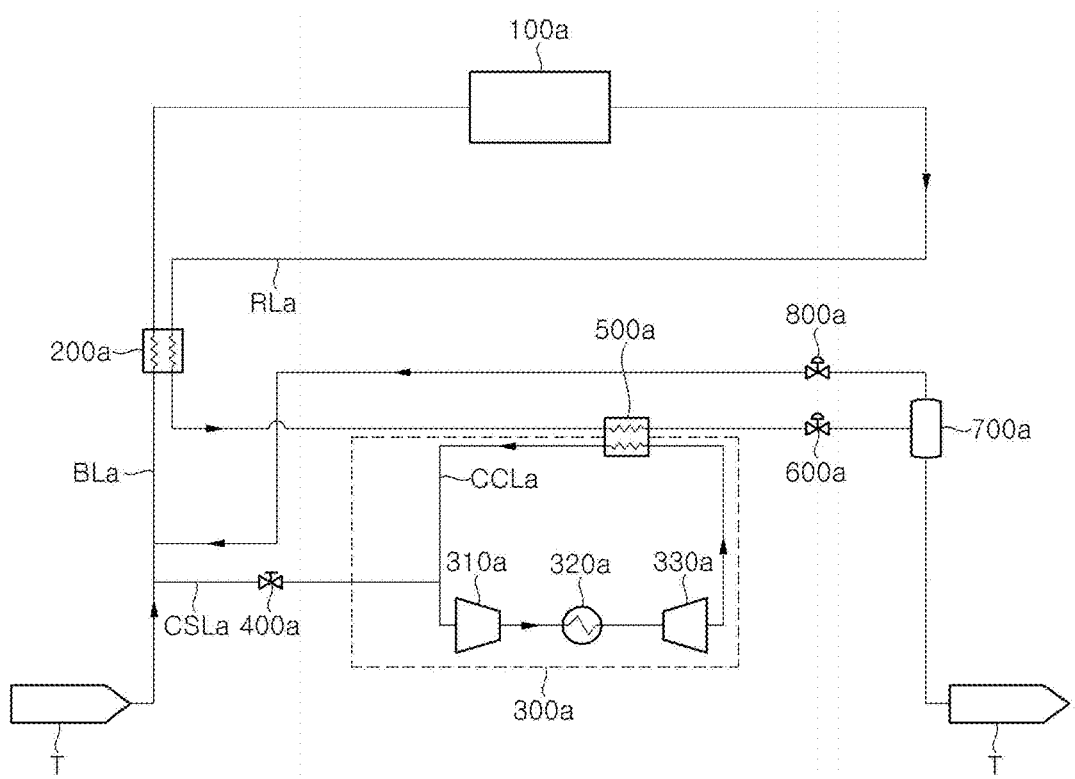

[FIG 3]
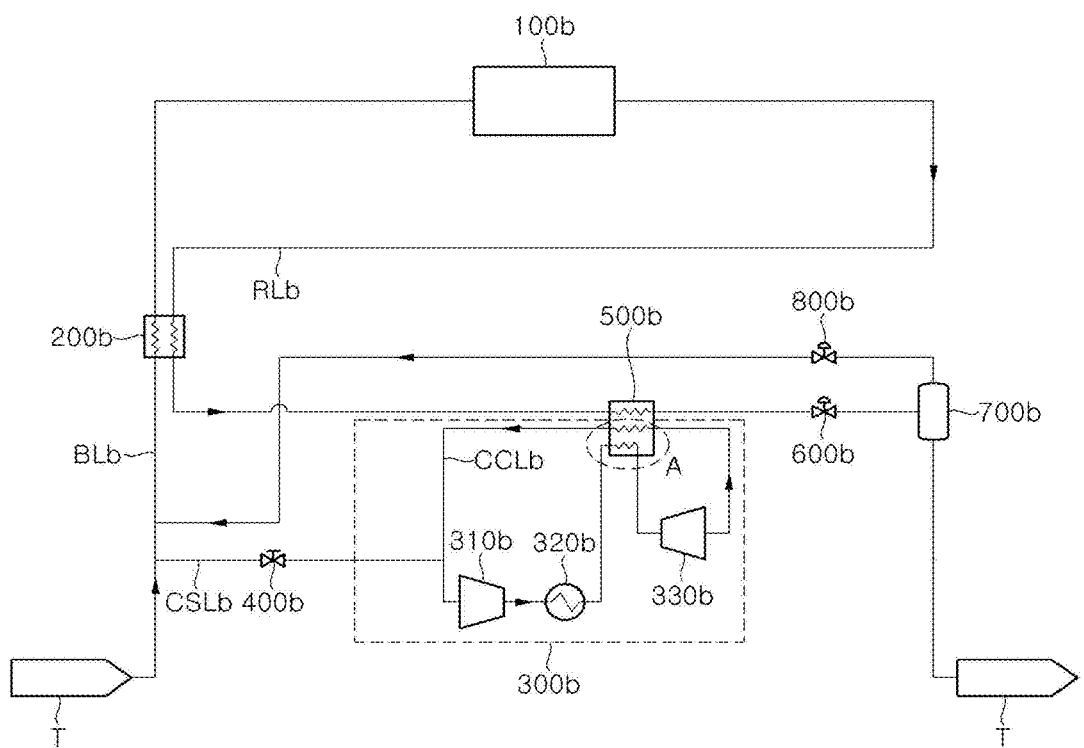

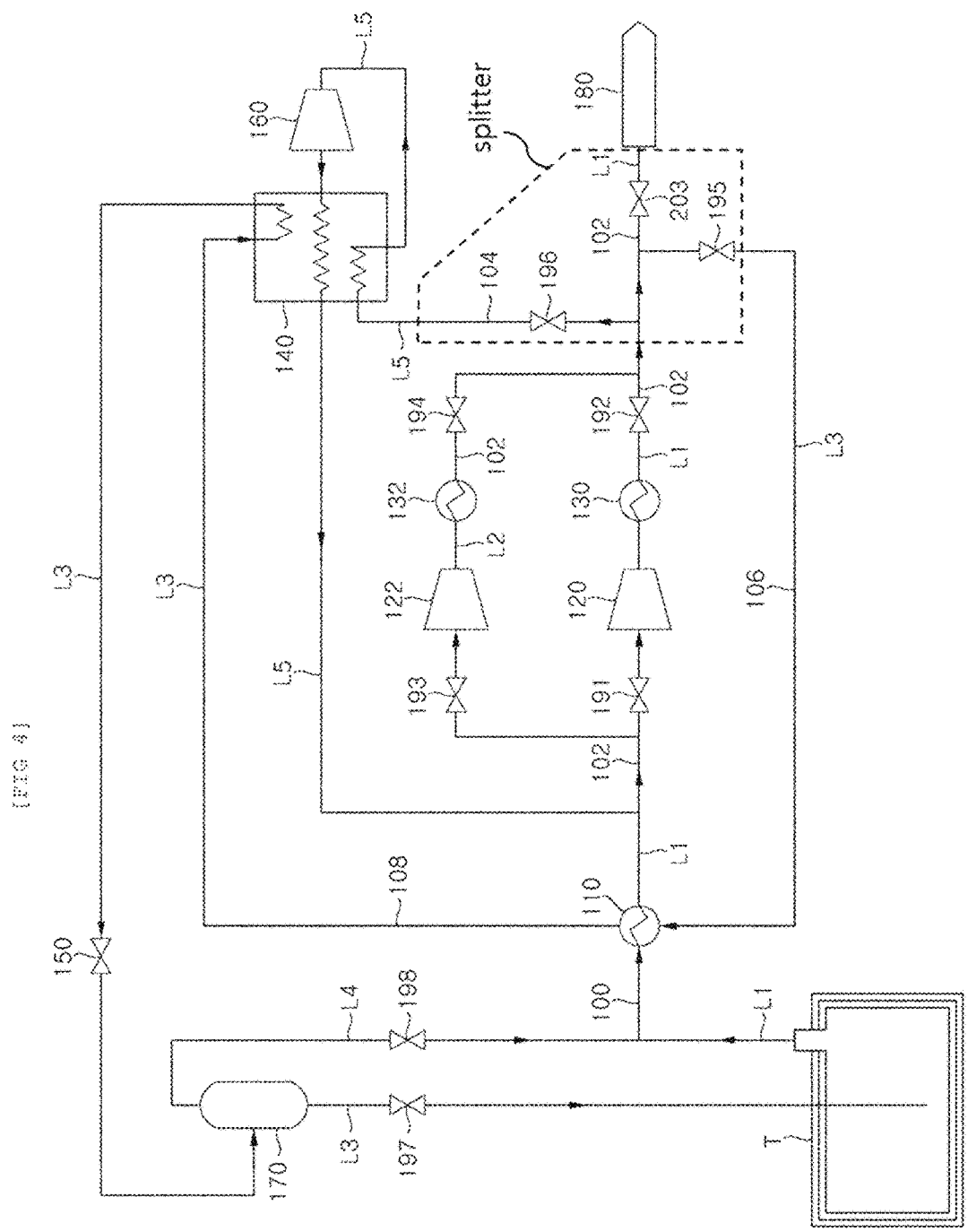

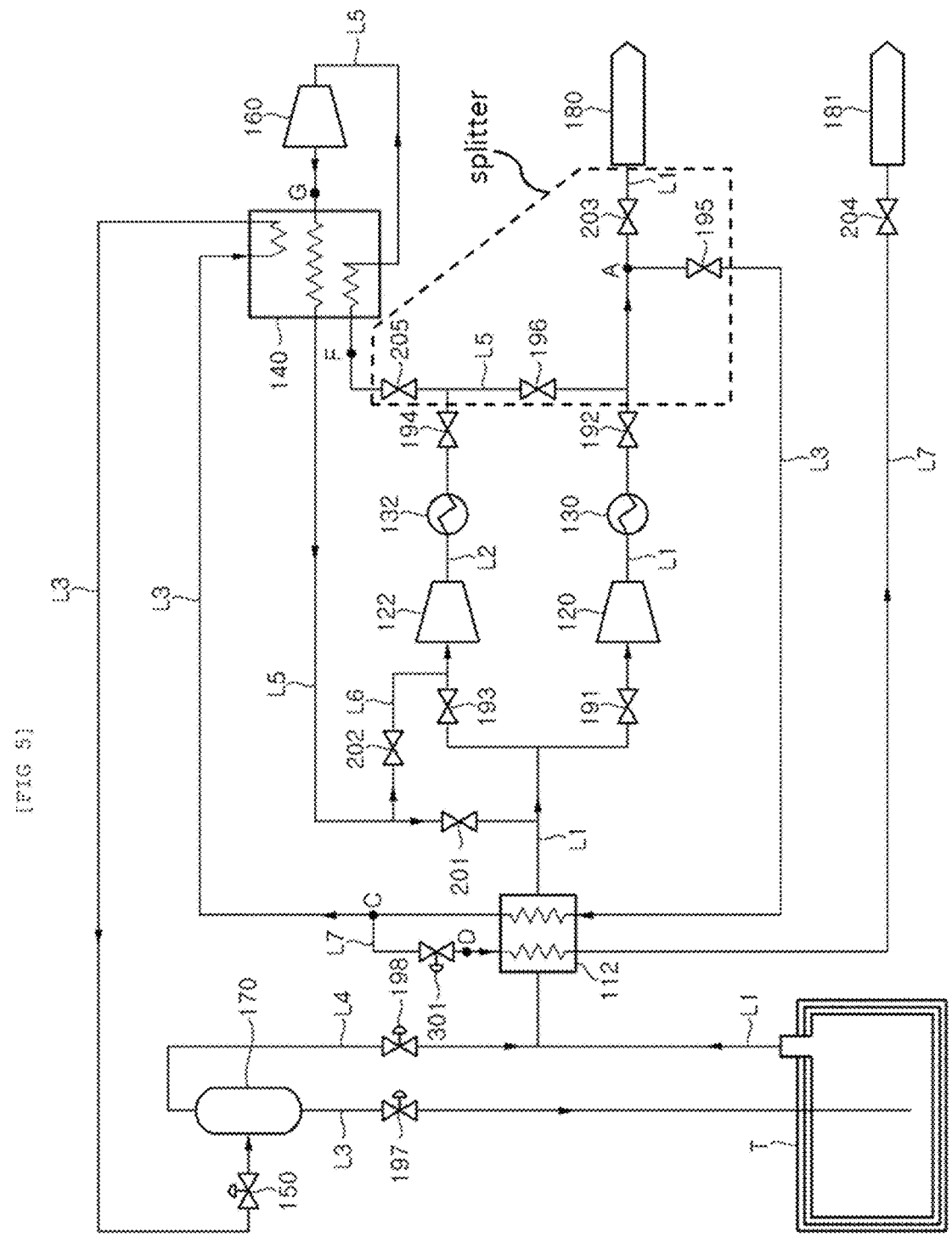

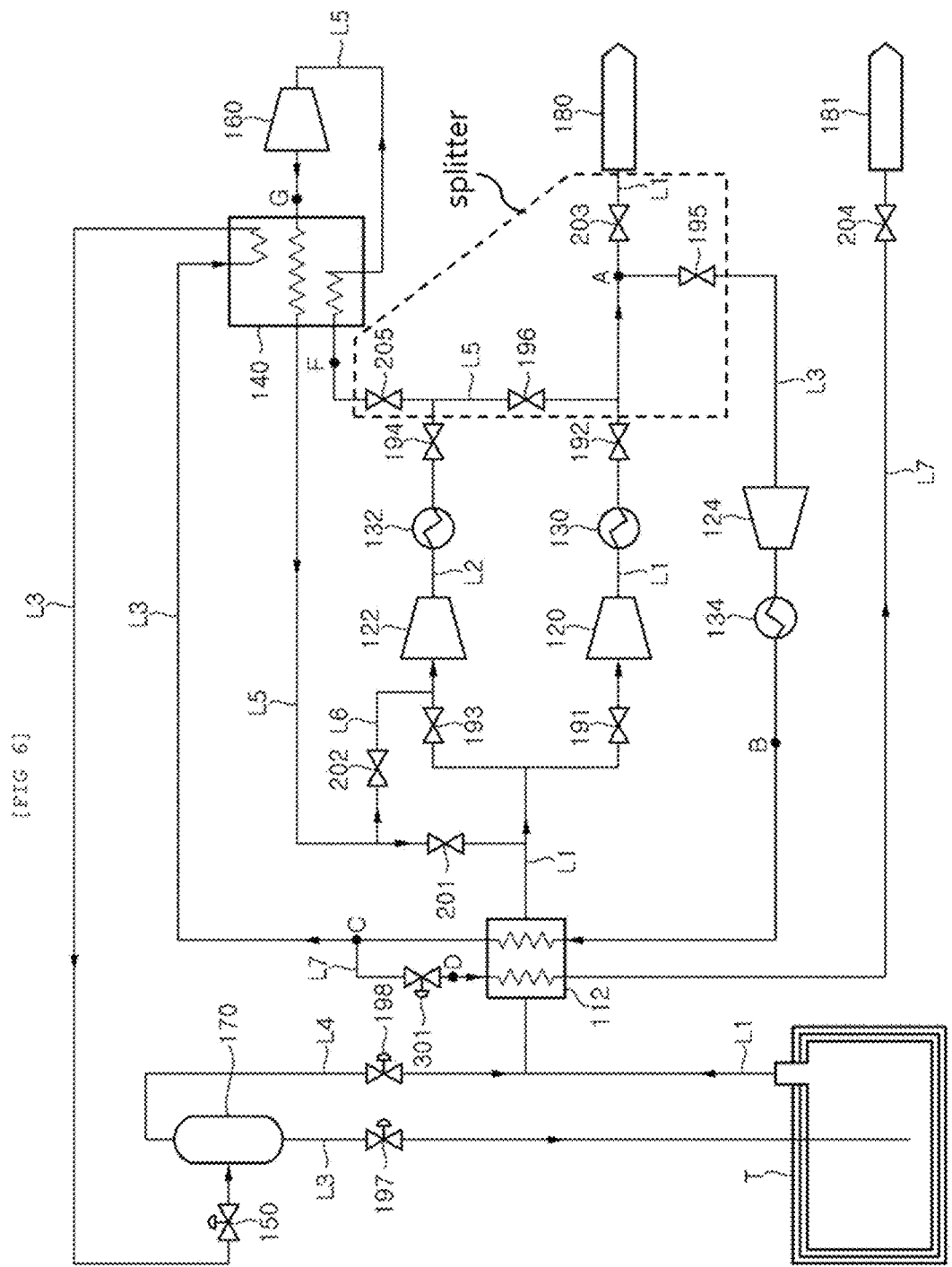

[FIG 7]
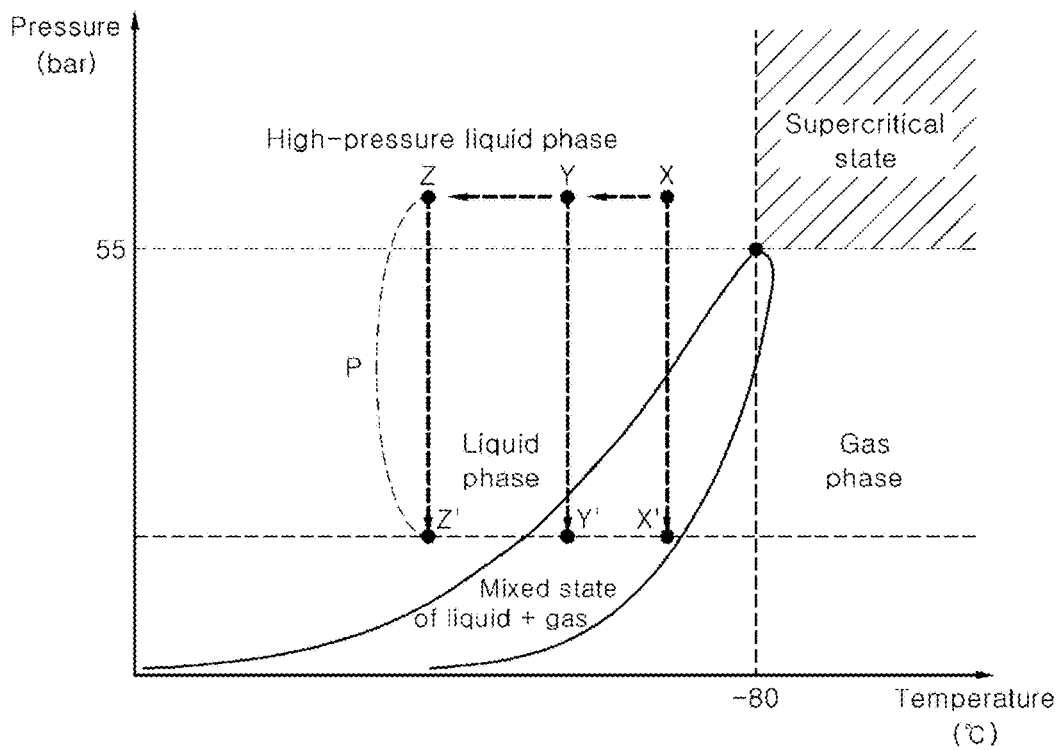

[FIG 8]
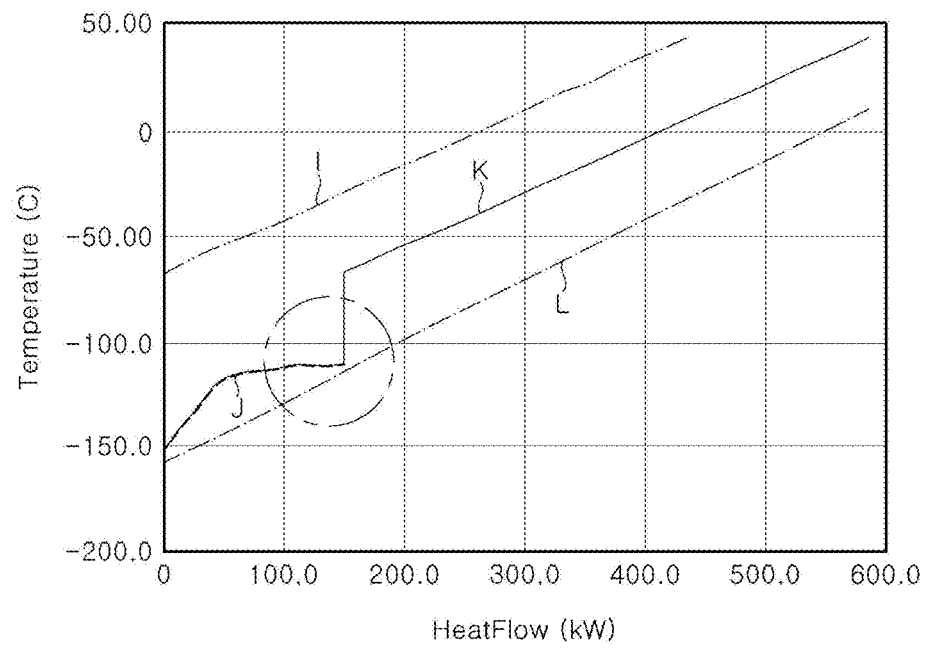
(a)
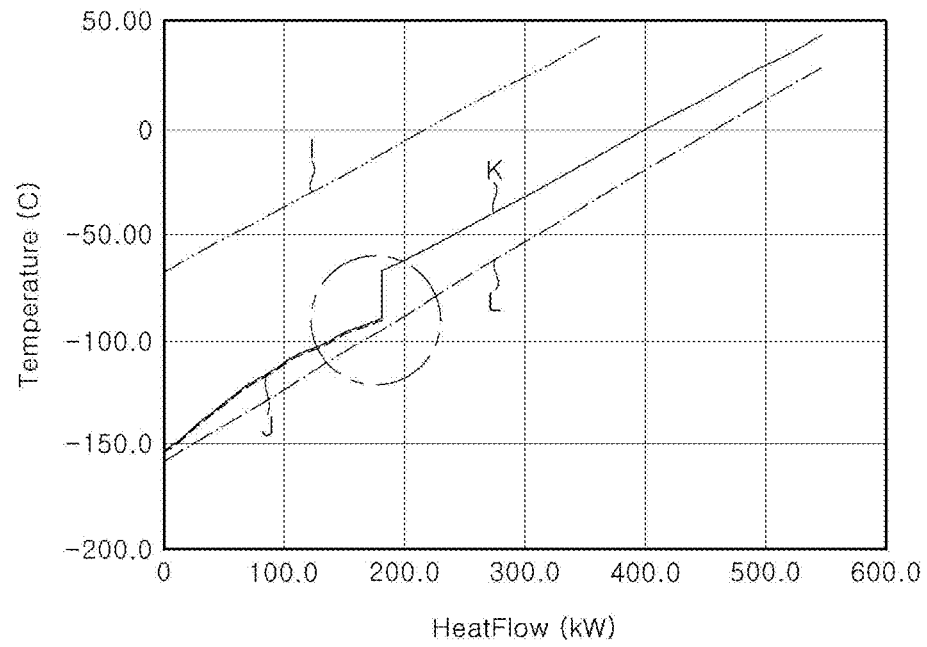
(b)

SHIP

TECHNICAL FIELD

The present invention relates to a ship, and more particularly, to a ship including a system for re-liquefying boil-off gas left after being used as fuel of an engine among boil-off gases generated in a storage tank.

BACKGROUND ART

In recent years, consumption of liquefied gas such as liquefied natural gas (LNG) has been rapidly increasing worldwide. Since a volume of liquefied gas obtained by liquefying gas at a low temperature is much smaller than that of gas, the liquefied gas has an advantage of being able to increase storage and transport efficiency. In addition, the liquefied gas, including liquefied natural gas, can remove or reduce air pollutants during the liquefaction process, and therefore may also be considered as eco-friendly fuel with less emission of air pollutants during combustion.

The liquefied natural gas is a colorless transparent liquid obtained by cooling and liquefying methane-based natural gas to about −162° C., and has about 1/600 less volume than that of natural gas. Therefore, to very efficiently transport the natural gas, the natural gas needs to be liquefied and transported.

However, since the liquefaction temperature of the natural gas is a cryogenic temperature of −162° C. at normal pressure, the liquefied natural gas is sensitive to temperature change and easily boiled-off. As a result, the storage tank storing the liquefied natural gas is subjected to a heat insulating process. However, since external heat is continuously sent to the storage tank, boil-off gas (BOG) is generated as the liquefied natural gas is continuously vaporized naturally in the storage tank during transportation of the liquefied natural gas. This goes the same for other low-temperature liquefied gases such as ethane.

The boil-off gas is a kind of loss and is an important problem in transportation efficiency. In addition, if the boil-off gas is accumulated in the storage tank, an internal pressure of the tank may rise excessively, and if the internal pressure of the tank becomes more severe, the tank is highly likely to be damaged. Accordingly, various methods for treating the boil-off gas generated in the storage tank have been studied. Recently, to treat the boil-off gas, a method for re-liquefying boil-off gas and returning the re-liquefied boil-off gas to the storage tank, a method for using boil-off gas as an energy source for fuel consumption places like an engine of a ship, or the like have been used.

As the method for re-liquefying boil-off gas, there are a method for re-liquefying boil-off gas by heat-exchanging the boil-off gas with a refrigerant by a refrigeration cycle using a separate refrigerant, a method for re-liquefying boil-off gas by the boil-off gas itself as a refrigerant without using a separate refrigerant, or the like. In particular, the system employing the latter method is called a partial re-liquefaction System (PRS).

Generally, on the other hand, as engines which can use natural gas as fuel among engines used for a ship, there are gas fuel engines such as a DFDE engine and an ME-GI engine.

The DFDE engine adopts an Otto cycle which consists of four strokes and injects natural gas with a relatively low pressure of approximately 6.5 bars into a combustion air inlet and compresses the natural gas as the piston lifts up.

The ME-GI engine adopts a diesel cycle which consists of two strokes and employs a diesel cycle which directly injects high pressure natural gas near 300 bars into the combustion chamber around a top dead point of the piston. Recently, there is a growing interest in the ME-GI engine, which has better fuel efficiency and boost efficiency.

DISCLOSURE

Technical Problem

An object of the present invention is to provide a ship including a system capable of providing better boil-off gas re-liquefying performance than the existing partial re-liquefaction system.

Technical Solution

According to an exemplary embodiment of the present invention, there is provided a ship including a storage tank storing liquefied gas, including: a boil-off gas heat exchanger which is installed on a downstream of a storage tank and heat-exchanges and cools a compressed boil-off gas (hereafter referred to as 'a first fluid') by a boil-off gas discharged from the storage tank as a refrigerant; a compressor which is installed on a downstream of the boil-off gas heat exchanger and compresses a part of the boil-off gas discharged from the storage tank; an extra compressor which is installed on the downstream of the boil-off gas heat exchanger in parallel with the compressor and compresses the other part of the boil-off gas discharged from the storage tank; a refrigerant heat exchanger which additionally cools the first fluid which is cooled by the boil-off gas heat exchanger; a refrigerant decompressing device which expands a second fluid, which is sent to the refrigerant heat exchanger (a fluid sent to the refrigerant heat exchanger hereafter being referred to as 'a second fluid') and cooled by the refrigerant heat exchanger, and then sending same back to the refrigerant heat exchanger; a first decompressing device which is for expanding the first fluid that is cooled by the boil-off gas heat exchanger and refrigerant heat exchanger; and a third decompressing device which expands a part of the first fluid which is cooled by the boil-off gas heat exchanger (hereafter referred to as "a third fluid") and sends the expanded fluid back to the boil-off gas heat exchanger, in which the boil-off gas heat exchanger uses the boil-off gas being discharged from the storage tank and the third fluid as a refrigerant and the refrigerant heat exchanger heat exchanges and cools both the first fluid and second fluid by the boil-off gas, which passes through the refrigerant decompressing device, as a refrigerant, in which the first fluid is either the boil-off gas which is compressed by the compressor or a confluent flow of the boil-off gas compressed by the compressor and the boil-off gas compressed by the extra compressor, and the second fluid is either the boil-off gas which is compressed by the extra compressor or a confluent flow of the boil-off gas compressed by the compressor and the boil-off gas compressed by the extra compressor.

The ship may further include a gas-liquid separator that separates the partially re-liquefied liquefied gas passing through the boil-off gas heat exchanger, the refrigerant heat exchanger, and the first decompressing device and the boil-off gas remaining in a gas phase, in which the liquefied gas separated by the gas-liquid separator may be sent to the storage tank, and the boil-off gas separated by the gas-liquid separator may be sent to the boil-off gas heat exchanger.

The first fluid may be branched into two flows on an upstream of a high pressure engine, and a part of the first fluid may be sent to the boil-off gas heat exchanger to be cooled and the other part thereof may be sent to the high pressure engine.

The ship may further include a fourth decompressing device which expands a third fluid used as a refrigerant in the boil-off gas heat exchanger, in which the boil-off gas passing through the fourth decompressing device may be sent to a low pressure engine.

The ship may further include a boost compressor which is installed on the upstream of the boil-off gas heat exchanger to compress the first fluid supplied to the boil-off gas heat exchanger.

The boost compressor may have a capacity of ½ relative to that of the compressor.

The second fluid which is compressed by the extra compressor, passes through the refrigerant heat exchanger and the refrigerant decompressing device, and then used as the refrigerant of the refrigerant heat exchanger may be sent back to the extra compressor to form a refrigerant cycle of a closed loop in which the extra compressor, the refrigerant heat exchanger, the refrigerant decompressing device, and the refrigerant heat exchanger are connected.

The second fluid which is compressed by the extra compressor, passes through the refrigerant heat exchanger and the refrigerant decompressing device, and then used as the refrigerant of the refrigerant heat exchanger may be discharged from the storage tank and then joined with the boil-off gas passing the boil-off gas heat exchanger.

The ship may further include a valve which is installed on a line connecting the boil-off gas compressed by the compressor with the boil-off gas compressed by the extra compressor, in which the valve may be opened and closed to join the boil-off gas compressed by the compressor with the boil-off gas compressed by the extra compressor or separate the boil-off gas compressed by the compressor from the boil-off gas compressed by the extra compressor.

The refrigerant decompressing device may be an expander, and the fluid just before passing through the refrigerant decompressing device and the fluid just after passing through the refrigerant decompressing device may be a gas phase.

According to another exemplary embodiment of the present invention, there is provided a boil-off gas treatment system for a ship including a storage tank for storing a liquefied gas, including: a first supply line along which boil-off gas, which is discharged from the storage tank and partially compressed by a compressor, is sent to a high pressure engine; a second supply line which is branched from the first supply line and has an extra compressor provided thereon, with the extra compressor compressing the other part of the boil-off gas discharged from the storage tank; a return line which is branched from the first supply line and has a boil-off gas heat exchanger, a refrigerant heat exchanger, and a first decompressing device provided thereon, with the compressed boil-off gas being re-liquefied by passing through the boil-off gas heat exchanger, the refrigerant heat exchanger, and the first decompressing device; a recirculation line which has the refrigerant heat exchanger and a refrigerant decompressing device provided thereon, with the boil-off gas, which is cooled by passing through the refrigerant heat exchanger and a refrigerant decompressing device, being sent back to the refrigerant heat exchanger to be used as a refrigerant and then joined with the boil-off gas discharged from the storage tank; a first additional line which connects between the recirculation line on a downstream of the refrigerant decompressing device and the refrigerant heat exchanger and a second supply line on an upstream of the extra compressor; a third supply line which is branched from the return line on the downstream of the boil-off gas heat exchanger, the boil-off gas being sent to the low pressure engine by passing through a third decompressing device, the boil-off gas heat exchanger and a fourth decompressing device along the third supply line, in which the boil-off gas heat exchanger heat-exchanges and cools the boil-off gas supplied along the return line by the boil-off gas discharged from the storage tank and the boil-off gas supplied along the third supply line as the refrigerant, and the refrigerant heat exchanger heat-exchanges and cools both of the boil-off gas supplied along the recirculation line and the boil-off gas supplied along the return line by the boil-off gas passing through the refrigerant decompressing device as the refrigerant.

The boil-off gas treatment system may further include a boost compressor which is installed on the return line on the upstream of the boil-off gas heat exchanger to compress the boil-off gas.

The boil-off gas treatment system for a ship may further include: a first valve which is installed on an upstream of the compressor on the first supply line; a second valve which is installed on a downstream of the compressor on the first supply line; a third valve which is installed on an upstream of the extra compressor on the second supply line; a fourth valve installed on a downstream of the extra compressor on the second supply line; a sixth valve which is provided between the first supply line and the second supply line on the recirculation line along which the boil-off gas branched from the first supply line is sent to the refrigerant heat exchanger; a ninth valve which is installed on the recirculation line for sending the boil-off gas from the refrigerant heat exchanger to the first supply line; a tenth valve which is installed on the first additional line; and a thirteenth valve which is installed on the recirculation line between the second supply line and the refrigerant heat exchanger.

The system may be operated while the first valve, the second valve, the third valve, the fourth valve, the tenth valve, and the thirteenth valve are open and the sixth valve and the ninth valve are closed, and if the boil-off gas is supplied to the extra compressor, the third valve may be closed to form the refrigerant cycle of the closed loop in which the boil-off gas circulates the extra compressor, the fourth valve, the thirteenth valve, the refrigerant heat exchanger, the refrigerant decompressing device, the refrigerant heat exchanger, and the tenth valve.

The first valve, the second valve, the third valve, the fourth valve, the sixth valve, the ninth valve, and the thirteenth valve may be open and the tenth valve may be closed so that the boil-off gas compressed by the compressor and the boil-off gas compressed by the extra compressor may be joined and operated.

The first valve, the second valve, the third valve, the fourth valve, the ninth valve, and the thirteenth valve may be open and the sixth valve and the tenth valve may be closed so that the boil-off gas compressed by the compressor and the boil-off gas compressed by the extra compressor may be separated and operated.

According to another exemplary embodiment of the present invention, there is provided a method including: branching boil-off gas discharged from a liquefied gas storage tank into two and compressing one flow of the branched boil-off gas by a compressor; compressing the other flow by an extra compressor; sending at least one of the boil-off gas compressed by the compressor and the boil-off gas compressed by the extra compressor to a high pressure engine or re-liquefying the boil-off gas to return the boil-off gas to the storage tank (hereinafter, referred to as 'returning boil-off gas') or re-circulate the boil-off gas (hereinafter, referred to as 're-circulated boil-off gas'); heat-exchanging and cooling the 'returning boil-off gas' by the boil-off gas discharged from the storage tank and the decompressed and cooled boil-off gas (hereinafter, referred to as 'decompressed boil-off gas') as a refrigerant, and then exchanging heat between the heat-exchanged and cooled 'returning boil-off gas' and the 're-circulated boil-off gas' to be additionally cooled; and cooling and expanding the 're-circulated boil-off gas' to exchange heat between the cooled and expanded 're-circulated boil-off gas' and the 'returning boil-off gas'.

The 'decompressed boil-off gas' may be boil-off gas decompressed after a part of the heat-exchanged and cooled returning boil-off gas' is decompressed.

The 'decompressed boil-off gas' used as the refrigerant for the heat exchange may be sent to the low pressure engine.

The downstream line of the compressor and the downstream line of the extra compressor may be connected to each other to join the boil-off gas compressed by the compressor with the boil-off gas compressed by the extra compressor.

Advantageous Effects

Compared with the existing partial re-liquefaction system (PRS), the present invention can increase the re-liquefaction efficiency and the re-liquefaction amount since the boil-off gas is decompressed after undergoing the additional cooling process by the refrigerant heat exchanger. In particular, most or all of the remaining boil-off gas can be re-liquefied without employing the refrigeration cycle using the separate refrigerant, and therefore increasing the economical efficiency.

Further, according to the present invention, it is possible to flexibly control the refrigerant flow rate and the supply of cold heat in response to the discharge amount of the boil-off gas, the engine load depending on the operating speed of the ship, and the like.

According to the embodiment of the present invention, it is possible to contribute to securing the space on the ship and save the cost of additionally installing the compressor by increasing the re-liquefaction efficiency and the re-liquefaction amount by using the extra compressor already provided. In particular, the refrigerant heat exchanger can use not only the boil-off gas compressed by the extra compressor but also the boil-off gas compressed by the compressor as the refrigerant to increase the flow rate of the boil-off gas used as the refrigerant in the refrigerant heat exchanger, thereby more increasing the re-liquefaction efficiency and the re-liquefaction amount.

According to another embodiment of the present invention, the decompressed boil-off gas sent to the low pressure engine can be used as the refrigerant in the boil-off gas heat exchanger, thereby increasing the re-liquefaction efficiency and the re-liquefaction amount.

According to another embodiment of the present invention, the pressure of the boil-off gas undergoing the re-liquefaction process can be increased due to the additionally included boost compressor, thereby further increasing the re-liquefaction efficiency and the re-liquefaction amount.

BRIEF DESCRIPTION OF THE DRAWINGS

FIG. 1 is a configuration diagram schematically showing the existing partial re-liquefaction system.

FIG. 2 is a configuration diagram schematically showing a boil-off gas treatment system for a ship according to a first embodiment of the present invention.

FIG. 3 is a configuration diagram schematically showing a boil-off gas treatment system for a ship according to a second embodiment of the present invention.

FIG. 4 is a configuration diagram schematically showing a boil-off gas treatment system for a ship according to a third embodiment of the present invention.

FIG. 5 is a configuration diagram schematically showing a boil-off gas treatment system for a ship according to a fourth embodiment of the present invention.

FIG. 6 is a configuration diagram schematically showing a boil-off gas treatment system for a ship according to a fifth embodiment of the present invention.

FIG. 7 is a graph schematically illustrating a phase change of methane depending on temperature and pressure.

FIG. 8 shows graphs showing temperature values of methane depending on a heat flow under different pressures.

BEST MODE

Hereinafter, configurations and effects of exemplary embodiments of the present invention will be described with reference to the accompanying drawings. The present invention can variously be applied to ships such as a ship equipped with an engine using natural gas as fuel and a ship including a liquefied gas storage tank. In addition, the following embodiments may be changed in various forms, and therefore the technical scope of the present invention is not limited to the following embodiments.

Boil-off gas systems of the present invention to be described below can be applied to offshore structures such as LNG FPSO and LNG FSRU, in addition to all types of ships and offshore structures equipped with a storage tank capable of storing a low-temperature fluid cargo or liquefied gas, i.e., ships such as a liquefied natural gas carrier, a liquefied ethane gas carrier, and LNG RV. However, for convenience of explanation, the following embodiments will describe, by way of example, liquefied natural gas which is a typical low-temperature fluid cargo.

Further, a fluid on each line of the present invention may be in any one of a liquid phase, a gas-liquid mixed state, a gas phase, and a supercritical fluid state, depending on operating conditions of a system.

FIG. 1 is a configuration diagram schematically showing the existing partial re-liquefaction system.

Referring to FIG. 1, in the conventional partial re-liquefaction system, the boil-off gas generated and discharged from a storage tank storing a fluid cargo is sent along a pipe and compressed by a boil-off gas compressor 10.

A storage tank T is provided with a sealing and heat insulating barrier to be able to store liquefied gas such as liquefied natural gas at a cryogenic temperature. However, the sealing and heat insulating barrier may not completely shut off heat transmitted from the outside. Therefore, the liquefied gas is continuously evaporated in the storage tank, so an internal pressure of the storage tank may be increased. Accordingly, to prevent the pressure of the tank from excessively increasing due to the boil-off gas and keep the internal pressure of the tank at an appropriate level, the boil-off gas in the storage tank is discharged and is then supplied to the boil-off compressor 10.

When the boil-off gas discharged from the storage tank and compressed by the boil-off gas compressor 10 is referred to as a first stream, the first flow of the compressed boil-off gas is divided into a second flow and a third stream, and the second flow may be formed to be liquefied and then return to the storage tank T, and the third flow may be formed to be supplied to gas fuel consumption places such as a boost engine and a power generation engine in a ship. In this case, in the boil-off gas compressor 10 can compress the boil-off gas to a supply pressure of the fuel consumption place, and the second flow may be branched via all or a part of the boil-off gas compressor if necessary. All of the boil-off gas compressed as the third flow may also be supplied according to the amount of fuel required for the fuel consumption place, and all of the compressed boil-off gas may return to the storage tank by supplying the whole amount of boil-off gas as the second stream. An example of the gas fuel consumption places may include a DF generator, a gas turbine, DFDE, and the like, in addition to high pressure gas injection engine (e.g., ME-GI engines developed by MDT Co., etc.) and low-temperature gas injection engines (e.g., generation X-dual fuel engine (X-DF engine) by Wartsila Co.).

At this time, a heat exchanger 20 is provided to liquefy the second flow of the compressed boil-off gas. The boil-off gas generated from the storage tank is used as a cold heat supply source of the compressed boil-off gas. The compressed boil-off gas, that is, the second stream, whose temperature rises while being compressed by the boil-off gas compressor while passing through the heat exchanger 20 is cooled, and the boil-off gas generated from the storage tank and introduced into the heat exchanger 20 is heated and then supplied to the boil-off gas compressor 10.

Since a flow rate of pre-compressed boil-off gas is compressed is greater than that of the second stream, the second flow of the compressed boil-off gas may be at least partially liquefied by receiving cold heat from the boil-off gas before being compressed. As described above, the heat exchanger exchanges heat the low-temperature boil-off gas immediately after being discharged from the storage tank with the high-pressure boil-off gas compressed by the boil-off gas compressor to liquefy the high-pressure boil-off gas.

The boil-off gas of the second flow passing through the heat exchanger 20 is further cooled while being decompressed by passing through an expansion means 30 such as an expansion valve or an expander and is then supplied to a gas-liquid separator 40. The gas-liquid separator 40 separates the liquefied boil-off gas into gas and liquid components. The liquid component, that is, the liquefied natural gas returns to the storage tank, and the gas component, that is, the boil-off gas is discharged from the storage tank to be joined with a flow of boil-off gas supplied to the heat exchanger 20 and the boil-off gas compressor 10 or is then supplied back to the heat exchanger 20 to be utilized as a cold heat supply source which heat-exchanges high-pressure boil-off gas compressed by the boil-off gas compressor 10. Of course, the boil-off gas may be sent to a gas combustion unit (GCU) or the like to be combusted or may be sent to a gas consumption place (including a gas engine) to be consumed. Another expansion means 50 for additionally decompressing the gas separated by the gas-liquid separator before being joined with the flow of boil-off gas may be further provided.

FIG. 2 is a configuration diagram schematically showing a boil-off gas treatment system for a ship according to a first embodiment of the present invention.

Referring to FIG. 2, the system of the present embodiment includes a refrigerant circulator 300*a* which is supplied with boil-off gas generated from a low temperature fluid cargo stored in a storage tank and circulates the boil-off gas as a refrigerant.

To this end, the system includes a refrigerant supply line CSLa which supplies boil-off gas from the storage tank to a refrigerant circulator 300*a*. The refrigerant supply line is provided with a valve 400*a* to shut off the refrigerant supply line CSLa if a sufficient amount of boil-off gas, which may circulate the refrigerant circulator, is supplied, such that the refrigerant circulator 300*a* is operated as a closed loop.

Similar to the above-described basic embodiment, even in the first modified embodiment, the compressor 100*a* for compressing the boil-off gas generated from the low-temperature fluid cargo in the storage tank T is also provided. The boil-off gas generated from the storage tank is introduced into the compressor 100*a* along a boil-off gas supply line BLa.

The storage tank (T) of the present embodiment may be an independent type tank in which a load of the fluid cargo is not directly applied to a heat insulating layer, or a membrane type tank in which the load of the cargo is directly applied to the heat insulating layer. The independent type tank can be used as a pressure vessel which is designed to withstand a pressure of 2 barg or more.

Meanwhile, in the present embodiment, only a line for re-liquefying the boil-off gas is shown. However, the boil-off gas compressed by the compressor may be supplied as fuel to a fuel consumption place including a boost engine and a power generation engine of a ship or an offshore structure. When a ship is anchored, there is little or no consumption of gas fuel, the whole amount of boil-off gas may also be supplied to a re-liquefaction line RLa.

The compressed boil-off gas is supplied to a boil-off gas heat exchanger 200*a* along the boil-off gas re-liquefaction line RLa. The boil-off gas heat exchanger 200*a* is provided over the boil-off gas re-liquefaction line RLa and the boil-off gas supply line BLa to exchange heat between boil-off gas introduced into the compressor 100*a* and the boil-off gas compressed by at least a part of the compressor. The boil-off gas whose temperature rises during the compression is cooled through the heat exchange with the low-temperature boil-off gas which is generated from the storage tank and is to be introduced into the compressor 100*a*.

A downstream of the boil-off gas heat exchanger 200*a* is provided with a refrigerant heat exchanger 500*a*. The boil-off gas, which is compressed and then heat-exchanged by the boil-off gas heat exchanger is additionally cooled by the heat exchange with the boil-off gas which circulates the refrigerant circulator 300*a*.

The refrigerant circulator 300*a* includes a refrigerant compressor 310*a* which compresses the boil-off gas supplied from the storage tank, a cooler 320*a* which cools the boil-off gas compressed by the refrigerant compressor, and a refrigerant decompressing device 330*a* which decompresses and additionally cools the boil-off gas cooled by the cooler. The refrigerant decompressing device 330*a* may be an expansion valve or an expander which thermally expands and cools the boil-off gas.

The boil-off gas cooled by the refrigerant decompressing device 330*a* is supplied as a refrigerant to the refrigerant heat exchanger 500*a* along the refrigerant circulation line CCLa. The refrigerant heat exchanger 500*a* cools the boil-off gas by the heat exchange with the boil-off gas supplied via the boil-off gas heat exchanger 200*a*. The boil-off gas of the refrigerant circulation line CCLa passing through the refrigerant heat exchanger 500*a* is circulated to the refrigerant compressor 310*a* and circulates the refrigerant circulation line while undergoing the above-described compression and cooling processes.

Meanwhile, the boil-off gas of the boil-off gas re-liquefaction line RLa cooled by the refrigerant heat exchanger 500a is decompressed by a first decompressing device 600a. The first decompressing device 600a may be an expansion valve, such as a Joule-Thomson valve, or an expander.

The decompressed boil-off gas is separated into gas and liquid by being supplied to a gas-liquid separator 700a on a downstream of the first decompressing device 600a, and the liquid separated by the gas-liquid separator 700a, that is, the liquefied natural gas is supplied to the storage tank T and again stored.

The gas separated by the gas-liquid separator 700a, that is, the boil-off gas is additionally decompressed by a second decompressing device 800a, and is joined with the flow of boil-off gas to be introduced into the boil-off gas heat exchanger 200a from the storage tank T or is supplied to the boil-off gas heat exchanger 200a to be utilized as the cold heat supply source which heat-exchanges a high-pressure boil-off gas compressed by the compressor 100a. Of course, the boil-off gas may be sent to a gas combustion unit (GCU) or the like to be combusted or may be sent to a fuel consumption place (including a gas engine) to be consumed.

FIG. 3 is a configuration diagram schematically showing a boil-off gas treatment system for a ship according to a second embodiment of the present invention.

Referring to FIG. 3, according to the present embodiment, in a refrigerant circulator 300b, the boil-off gas which is to be introduced into a refrigerant decompressing device 330b from a cooler 320b is cooled by exchanging heat with the boil-off gas decompressed by the refrigerant decompressing device 330b and then supplied to the refrigerant decompressing device 330b.

Since the boil-off gas is cooled while being decompressed by the refrigerant decompressing device 330b, the boil-off gas downstream of the refrigerant decompressing device has temperature lower than that of the boil-off gas upstream of the refrigerant decompressing device. In this regard, according to the present embodiment, the boil-off gas upstream of the refrigerant decompressing device is cooled by exchanging heat with the boil-off gas downstream of the refrigerant decompressing device and then introduced into the decompressing device. To this end, as illustrated in FIG. 3, the boil-off gas upstream of the refrigerant decompressing device 330b may be supplied to the refrigerant heat exchanger 500b (portion A of FIG. 3). If necessary, a separate heat exchanging device which may exchange heat between the boil-off gases upstream and downstream of the refrigerant decompressing device may be additionally provided.

As described above, the system of the present embodiments can re-liquefy and store the boil-off gas generated from the storage tank fluid cargo, thereby increasing the transportation rate of the fluid cargo. In particular, even when the consumption of fuel on the in-ship gas consumption places is small, the gas can be combusted by the gas combustion unit (GCU) or the like to prevent the pressure of the storage tank from increasing to reduce or eliminate the amount of wasted cargo, thereby preventing a waste of energy.

In addition, the boil-off gas is circulated as the refrigerant to be utilized as the cold heat source for re-liquefaction, thereby effectively re-liquefying the boil-off gas without configuring the separate refrigerant cycle, and the separate refrigerant need not be supplied to contribute to securing the in-ship space and increase the economical efficiency. In addition, if the refrigerant is insufficient in the refrigerant cycle, the refrigerant may be replenished from the storage tank to be smoothly replenished and the refrigerant cycle may be effectively operated.

As described above, the boil-off gas may be re-liquefied by using the cold heat of the boil-off gas itself in multiple steps, so that the system configuration for treating the in-ship boil-off gas can be simplified and the cost required to install and operate the apparatus for complicated boil-off gas treatment can be saved.

FIG. 4 is a configuration diagram schematically showing a boil-off gas treatment system for a ship according to a third embodiment of the present invention.

Referring to FIG. 4, the ship of the present embodiment includes: a boil-off gas heat exchanger 110 which is installed on a downstream of the storage tank T; a compressor 120 and a first extra compressor 122 which are installed on a downstream of the boil-off gas heat exchanger 110 to compress boil-off gas discharged from the storage tank T; a cooler 130 which lowers temperature of the boil-off gas compressed by the extra compressor 120; a first extra cooler 132 which lowers the temperature of the boil-off gas compressed by the first extra compressor 122; a first valve 191 which is installed on an upstream of the compressor 120; a second valve 192 which is installed on a downstream of the cooler 130; a third valve 193 which is installed on an upstream of the first extra compressor 122; a fourth valve 194 which is installed on a downstream of the first extra cooler 132; a refrigerant heat exchanger 140 which additionally cools the boil-off gas cooled by the boil-off gas heat exchanger 110; a refrigerant decompressing device 160 which expands the boil-off gas passing through the refrigerant heat exchanger 140 and then sends the expanded boil-off gas back to the refrigerant heat exchanger 140; and a first decompressing device 150 which expands the boil-off gas additionally cooled by the refrigerant heat exchanger 140.

The boil-off gas, which is naturally generated from the storage tank T and then discharged, is supplied to a fuel consumption source 180 along the first supply line L1. The ship of the present embodiment may further include an eleventh valve 203 which is installed upstream of the fuel consumption place 180 to control a flow rate of the boil-off gas sent to the fuel consumption place 180 and opening/closing thereof.

The boil-off gas heat exchanger 110 is installed on the first supply line L1 and recovers cold heat from the boil-off gas immediately after being discharged from the storage tank T. The boil-off gas heat exchanger 110 is supplied with the boil-off gas discharged from the storage tank T and uses the boil-off gas supplied to the boil-off gas heat exchanger 110 along the return line L3 as a refrigerant. The fifth valve 195 which controls the flow rate of the boil-off gas and opening/closing thereof may be installed on a return line L3.

The compressor 120 and the first extra compressor 122 compress the boil-off gas passing through the boil-off gas heat exchanger 110. The compressor 120 is installed on the first supply line L1 and the first extra compressor 122 is installed on the second supply line L2. The second supply line L2 is branched from the first supply line L1 on the upstream of the compressor 120 and connected to the first supply line L1 on the downstream of the compressor 120. In addition, the compressor 120 and the first extra compressor 122 are installed in parallel, and may have the same performance.

In general, the ship is additionally provided with the first extra compressor 122 and the first extra cooler 132 for preparing for the case where the compressor 120 and the cooler 130 fail. Typically, the first extra compressor 122 and the first extra cooler 132 are not used at ordinary times when the compressor 120 or the cooler 130 does not fail.

That is, typically, at ordinary times when the compressor 120 or the cooler 130 does not fail, the third valve 193 on an upstream of the first extra compressor 122 and the fourth valve 194 on a downstream of the first extra cooler 132 are closed so that the boil-off gas is supplied to the fuel consumption place 180 via the compressor 120 and the cooler 130, and when the compressor 120 or the cooler 130 fails, the third valve 193 on the upstream of the first extra compressor 122 and the fourth valve 194 on the downstream of the first extra cooler 132 are open and the first valve 191 on the upstream of the compressor 120 and the second valve 192 on a downstream of the cooler 130 are closed so that the boil-off gas is supplied to the fuel consumption place 180 via the first extra compressor 122 and the first extra cooler 132.

The present invention is to increase the re-liquefaction efficiency and re-liquefaction amount of the boil-off gas by using the first extra compressor 122 and the first extra cooler 132 which are not used even if they are installed in the ship, and sends a part of the boil-off gas compressed by the first extra compressor 122 to the fuel consumption place 180 and uses the other part of the boil-off gas as a refrigerant which additionally cools the boil-off gas in the refrigerant heat exchanger 140.

FIG. 7 is a graph schematically illustrating a phase change of methane depending on temperature and pressure. Referring to FIG. 7, methane becomes a supercritical fluid state at a temperature of approximately −80° C. or higher and a pressure of approximately 55 bars or higher. That is, in the case of methane, a critical point is approximately −80° C. and 55 bars. The supercritical fluid state is a third state different from a liquid phase or a gas phase.

On the other hand, if the supercritical fluid states has a temperature lower than the critical point at a pressure equal to or higher than the critical point, it may also be a state in which a density is high, unlike a general liquid phase. Here, the state of the boil-off gas having a pressure equal to or higher than the critical point and a temperature equal to or lower than the critical point is referred to as a 'high-pressure liquid phase'.

The boil-off gas compressed by the compressor 120 or the first extra compressor 122 may be in a gaseous state or in a supercritical fluid state depending on how much the boil-off gas is compressed.

When the boil-off gas sent to the boil-off gas heat exchanger 110 through the return line L3 is in a gas phase, the temperature of the boil-off gas is lowered while the boil-off gas passes through the boil-off gas heat exchanger 110, and thus the boil-off gas may be a mixed state of liquid and gas. In the case of the supercritical fluid state, the temperature of the boil-off gas is lowered while the boil-off gas passes through the boil-off gas heat exchanger 110 and thus the boil-off gas may be the 'high-pressure liquid phase'.

The temperature of the boil-off gas cooled by the boil-off gas heat exchanger 110 is further lowered while the boil-off gas passes through the refrigerant exchanger 140. When the boil-off gas passing through the boil-off gas heat exchanger 110 is in the mixed state of liquid and gas, the temperature of the boil-off gas is further lowered while the boil-off gas passes through the refrigerant heat exchanger 140 and thus the boil-off gas becomes the mixed state in which a ratio of liquid is higher or becomes the liquid phase and in the case of the 'high-pressure liquid phase', the temperature of the boil-off gas is further lowered while the boil-off gas passes through the refrigerant heat exchanger 140.

Further, even when the boil-off gas which passes through the refrigerant heat exchanger 140 is in the 'high-pressure liquid phase', the pressure of the boil-off gas is lowered while the boil-off gas passes through the first decompressing device 150, and thus the boil-off gas becomes low in a liquid phase or the mixed state of liquid and gas.

It can be appreciated that even if the pressure of the boil-off gas is lowered to the same level (P in FIG. 7) by the first decompressing device 150, the boil-off gas becomes the mixed state in which the ration of the liquid is higher in the case where the boil-off gas is decompressed in the higher temperature (X→X' in FIG. 7) than in the case where the boil-off gas is decompressed in the lower temperature (Y→Y' in FIG. 7). Further, it can be appreciated that if the temperature may be further lowered, the boil-off gas can theoretically be re-liquefied 100% (Z→Z' in FIG. 7). Therefore, if the boil-off gas is cooled once more by the refrigerant heat exchanger 140 before passing through the first decompressing device 150, the re-liquefaction efficiency and the liquefaction amount can be increased.

Referring back to FIG. 4, compared with the first and second embodiments in which the refrigerant circulators 300*a* and 300*b* for additionally cooling the boil-off gas are configured as the closed loop, the present embodiment is different from the first and second embodiments in that the refrigerant cycle is configured as the open loop.

In the first and second embodiments, the refrigerant circulators 300*a* and 300*b* are configured as the closed loop, and thus the boil-off gas compressed by the refrigerant compressors 310*a* and 310*b* is used only as a refrigerant in the refrigerant heat exchangers 500*a* and 500*b* but may not be sent to the fuel consumption place or may not undergo the re-liquefaction process.

On the other hand, in the present embodiment, the refrigerant cycle is configured as the open loop, and thus the boil-off gas compressed by the first extra compressor 122 is joined with the boil-off gas compressed by the compressor 120, and then a part of the boil-off gas is sent to the fuel consumption place 180, the other part thereof is used as the refrigerant in the refrigerant heat exchanger 140 along the recirculation line L5, and the remaining part thereof undergoes the re-liquefaction process along the return line L3.

The recirculation line L5 is a line which is branched from the first supply line L1 on the downstream of the compressor 120 and connected to the first supply line L1 on the upstream of the compressor 120. A sixth valve 196 which controls the flow rate of the boil-off gas and the opening/closing thereof may be installed on the recirculation line L5 along which the boil-off gas branched from the first supply line L1 is sent to the refrigerant heat exchanger 140.

Compared with the first and second embodiments in which the refrigerant cycle is configured as the closed loop, the present embodiment in which the refrigerant cycle is configured as the open loop is greatly different from the first and second embodiments in that the downstream line of the compressor 120 and the downstream line of the first extra compressor 122 are connected. That is, in the present embodiment, the second supply line L2 on the downstream of the first extra compressor 122 is connected to the first supply line L1 on the downstream of the compressor 120, and thus the boil-off gas compressed by the first extra compressor 122 is joined with the boil-off gas compressed by the compressor 120 and then sent to the refrigerant heat exchanger 140, the fuel consumption place 180, or the boil-off gas heat exchanger 110. The present embodiment includes all other modifications in which the downstream of the compressor 120 and the downstream line of the first extra compressor 122 are connected.

Therefore, according to the present embodiment, upon the increase in the demanded amount of the fuel consumption place 180 such as the increase in the operating speed of the ship, the boil-off gas compressed by the first extra compressor 122 as well as the boil-off gas compressed by the compressor 120 as well as the compressed may be sent to the fuel consumption place 180.

Generally, however, since the compressor 120 and the first extra compressor 122 are designed to have a capacity of approximately 1.2 times the amount required in the fuel consumption place 180, the case in which the boil-off gas compressed by the first extra compressor 122 exceeding the capacity of the compressor 120 is sent to the fuel consumption place 180 little occurs. Rather, since the boil-off gas discharged from the storage tank T are entirely not consumed in the fuel consumption place 180 and therefore the boil-off gas to be re-liquefied increases, the case in which a large amount of refrigerant is required to re-liquefy a large amount of boil-off gas is more frequent.

According to the present embodiment, since not only the boil-off gas compressed by the compressor 120 but also the boil-off gas compressed by the first extra compressor 122 may be used as the refrigerant for the heat exchange in the refrigerant heat exchanger 140, the boil-off gas supplied to the refrigerant heat exchanger 140 along the return line L3 after passing through the boil-off gas heat exchanger 110 may be cooled to a lower temperature by using more refrigerant and the overall re-liquefaction efficiency and re-liquefaction amount may be increased. Theoretically, 100% re-liquefaction is possible.

Generally, upon determining the capacity of the compressors 120 and 122 provided in the ship, both of the capacity required for supplying the boil-off gas to the fuel consumption place 180 and the capacity required for re-liquefying the boil-off gas remaining by being not completely consumed in the fuel consumption place 180 are considered. According to the present embodiment, since the re-liquefaction amount may be increased by using the extra compressor 122, the capacity required for re-liquefaction may be reduced, and thus small-capacity compressors 120 and 122 can be provided. Reducing the capacity of the compressor can save both equipment installation costs and operating costs.

In the present embodiment, at ordinary times when the compressor 120 or the cooler 130 does not fail, not only the first valve 191 and the second valve 192 but also the third valve 193 and the fourth valve 194 are open so that all of the compressor 120, the cooler 130, the first extra compressor 122, and the first extra cooler 132 are operated, and when the compressor 120 or the cooler 130 fails, increasing the re-liquefaction efficiency and the re-liquefaction amount is abandoned and the first valve 191 and the second valve 192 are closed so that the system is operated only by the boil-off gas passing through the first extra compressor 122 and the first extra compressor 132.

For convenience of explanation, it is described that the compressor 120 and the cooler 130 play a major role and the first extra compressor 122 and the first extra cooler 132 play an auxiliary role. However, the compressor 120 and the first extra compressor 122 and the cooler 130 and the first extra cooler 132 play the same role. At least two compressors and coolers which play the same role are installed in one ship, and therefore when any one of the two compressors fail, the other unbroken compressor may be used, which may satisfy a redundancy concept. Next, the above description is applied.

Therefore, as in the case in which the compressor 120 or the cooler 130 fails, even in the case in which the first extra compressor 122 or the first extra cooler 132 fails, increasing the re-liquefaction efficiency and the re-liquefaction amount is abandoned, and the third valve 193 and the fourth valve 194 are closed so that the system is operated only the boil-off gas passing through the compressor 120 and the cooler 130.

On the other hand, when the ship is operated at a high speed enough that most or all of the boil-off gas discharged from the storage tank T can be used as fuel for the fuel consumption place 180, there is little or no amount of boil-off gas. Accordingly, when the ship is operated at a high speed, only one of the compressor 120 and the first extra compressor 122 may be operated.

The compressor 120 and the first extra compressor 122 may compress the boil-off gas to a pressure required by the fuel consumption place 180. The fuel consumption place 180 may be an engine, a generator, or the like which are operated by the boil-off gas as fuel. For example, if the fuel consumption place 180 is a boost engine for a ship, the compressor 120 and the first extra compressor 122 may compress the boil-off gas to a pressure of approximately 10 to 100 bars.

In addition, the compressor 120 and the first extra compressor 122 may also compress the boil-off gas to a pressure of approximately 150 bars to 400 bars when the fuel consumption place 180 is an ME-GI engine, and when the fuel consumption place 180 is a DFDE, the boil-off gas may be compressed to a pressure of approximately 6.5 bars, and when the fuel consumption place 180 is an X-DF engine, the boil-off gas may be compressed to a pressure of approximately 16 bars.

The fuel consumption place 180 may also include various kinds of engines. For example, when the fuel consumption place 180 includes the X-DF engine and the DFDE, the compressor 120 and the first extra compressor 122 may compress the boil-off gas to the pressure required by the X-DF engine, and the decompressing device is installed on the upstream of the DFDE to lower a part of the boil-off gas compressed at the pressure required by the X-DF engine to a pressure required by the DFDE and then supply the compressed boil-off gas to the DFDE.

In addition, in order to increase the re-liquefaction efficiency and the re-liquefaction amount in the boil-off gas heat exchanger 110 and the refrigerant heat exchanger 140, the compressor 120 or the first extra compressor 122 compresses the boil-off gas so that the pressure of the boil-off gas exceeds the pressure required by the fuel consumption place 180, and the decompressing device is installed on the upstream of the fuel consumption place 180 to lower the pressure of the compressed boil-off gas to exceed the pressure required by the fuel consumption place 180 to the pressure required by the fuel consumption place 180 and then supply the compressed boil-off gas to the fuel consumption place 180.

Meanwhile, the compressor 120 and the first extra compressor 122 may each be a multi-stage compressor. FIG. 4 illustrates that one compressor 120 or 122 compresses the boil-off gas to the pressure required by the fuel consumption place 180, but when the compressor 120 and the first extra compressor 122 are a multi-stage compressor, a plurality of compression cylinders may compress the boil-off gas to the pressure required by the fuel consumption place 180 several times.

When the compressor 120 and the first extra compressor 122 are a multi-stage compressor, the plurality of compression cylinders may be provided in the compressor 120 and the first extra compressor 122 in series and the plurality of coolers may each be provide on the downstream of the plurality of compression cylinders.

The cooler 130 of the present embodiment is installed downstream of the compressor 120 to cool the boil-off gas which is compressed by the compressor 120 and has the increased pressure and temperature. The first extra cooler 132 of the present embodiment is installed downstream of the first extra compressor 122 to cool the boil-off gas which is compressed by the first extra compressor 122 and has the increased pressure and temperature. The cooler 130 and the first extra cooler 132 may cool the boil-off gas by exchanging heat with seawater, fresh water, or air introduced from the outside.

The refrigerant heat exchanger 140 of the present embodiment additionally cools the boil-off gas which is cooled by the boil-off gas heat exchanger 110 and then supplied to the refrigerant heat exchanger 140 along the return line L3. The refrigerant decompressing device 160 of the present embodiment expands the boil-off gas which passes through the refrigerant heat exchanger 140 and then sends the expanded boil-off gas back to the refrigerant heat exchanger 140.

That is, the refrigerant heat exchanger 140 expands the boil-off gas, which passes through the boil-off gas heat exchanger 110 and then supplied to the refrigerant heat exchanger 140 along the return line L3, performs heat exchange by the refrigerant to additionally cool the boil-off gas expanded by the refrigerant decompressing device 160.

The refrigerant decompressing device 160 of the present embodiment may be various means for lowering the pressure of the fluid, and the state of the fluid just before passing through the refrigerant decompressing device 160 and the state of the fluid just after passing through the refrigerant decompressing device 160 may be changed depending on the operation condition of the system. However, when the refrigerant decompressing device 160 is an expander, in order to prevent a physical damage of the refrigerant decompressing device 160, the fluid just before passing through the refrigerant decompressing device 160 and the fluid just after passing through the refrigerant decompressing device 160 is preferably maintained in a gas phase. Next, the above description is applied.

By the boil-off gas used as the refrigerant for the heat exchange in the refrigerant heat exchanger 140 after passing through the refrigerant decompressing device 160, after the boil-off gas compressed by the compressor 120 is joined with the boil-off gas compressed by the first extra compressor 122, a part of the joined boil-off gas is supplied to the refrigerant heat exchanger 140 along the recirculation line L5 and cooled by exchanging heat with the boil-off gas, which passes through the refrigerant decompressing device 160, in the refrigerant heat exchanger 140 by the refrigerant and then supplied to the refrigerant decompressing device 160.

In addition, the boil-off gas supplied from the first supply line L1 to the refrigerant heat exchanger 140 along the first supply line L1 is primarily used in the refrigerant heat exchanger 140 and is additionally cooled by the refrigerant decompressing device 160 and is then sent back to the refrigerant heat exchanger 140, such that the boil-off gas is used as the refrigerant.

That is, the flow of the boil-off gas compressed by the compressor 120 supplied to the refrigerant heat exchanger 140 along the recirculation line L5 after being joined with the boil-off gas compressed by the first extra compressor 122 and the boil-off gas which passes through the boil-off gas heat exchanger 110 and is then supplied to the refrigerant heat exchanger 140 along the return line L3 exchange heat with each other by the boil-off gas, which passes through the refrigerant decompressing device 160, as a refrigerant to be cooled.

The first decompressing device 150 of the present embodiment is installed on the return line L3 to expand the boil-off gas cooled by the boil-off gas heat exchanger 110 and the refrigerant heat exchanger 140. The boil-off gas compressed by the compressor 120 is joined with the boil-off gas compressed by the first extra compressor 122 and then a part of the boil-off gas is branched into pass through the boil-off gas heat exchanger 110, the refrigerant heat exchanger 110 140, and the first decompressing device 150, such that the boil-off gas is partially or totally re-liquefied.

The first decompressing device 150 includes all means which may expand and cool the boil-off gas, and may be an expansion valve, such as a Joule-Thomson valve, or an expander.

The ship of the present embodiment may include the gas-liquid separator 170 which is installed on the return line L3 on the downstream of the first decompressing device 150 and separates the gas-liquid mixture discharged from the first decompressing device 150 into gas and liquid.

When the ship of the present embodiment does not include the gas-liquid separator 170, the liquid or the boil-off gas in the gas-liquid mixed state which passes through the first decompressing device 150 is immediately sent to the storage tank T.

When the ship of the present embodiment includes the gas-liquid separator 170, the boil-off gas which passes through the first decompressing device 150 is sent to the gas-liquid separator 170 to separate the gas phase and the liquid phase. The liquid separated by the gas-liquid separator 170 returns to the storage tank T along the return line L3 and the gas separated by the gas-liquid separator 170 is supplied to the boil-off gas heat exchanger 110 along a gas discharge line which extends from the gas-liquid separator 170 to the first supply line L1 on the upstream of the boil-off gas heat exchanger 110.

When the ship of the present embodiment includes the gas-liquid separator 170, the ship may further include a seventh valve 197 which controls the flow rate of the liquid separated by the gas-liquid separator 170 and sent to the storage tank T; an eighth valve 198 which controls the flow rate of gas separated by the gas-liquid separator 170 and sent to the boil-off gas heat exchanger 110.

The first to eighth valves and the eleventh valve 191, 192, 193, 194, 195, 196, 197, 198, and 203 of the present embodiment may be manually controlled by allowing a person to directly determine the operation condition of the system and may be automatically controlled to be opened or closed depending on a preset value.

The main flow of the boil-off gas is defined to easily describe the operation of the device for re-liquefaction of boil-off gas according to an embodiment of the present invention. A flow in which the boil-off gas generated from the storage tank T and the gas discharged from the gas-liquid separator 170 is supplied to the boil-off gas heat exchanger 110 is defined as a first flow 100, a flow which is supplied from the boil-off gas heat exchanger 110 to the compressor 120 and the first extra compressor 122 and then discharged from the compressor 120 or the first extra compressor 122 and supplied to the fuel consumption place 180 is defined as a second flow 102, a flow which is branched from the second flow 102 on the downstream of the compressor 120 and the first extra compressor 122 and the supplied to the refrigerant heat exchanger 140 is defined as a third flow 104, a flow which is branched from the second flow 102 on the downstream of the compressor 120 and the first extra compressor 122 and supplied to the boil-off gas heat exchanger 110 is defined as a fourth flow 106, and a flow which is supplied from the boil-off gas heat exchanger 110 to the refrigerant heat exchanger 140 is defined as a fifth flow 108. The first flow 100 becomes the second flow while passing through the boil-off heat exchanger 110 and the fourth flow 106 becomes the fifth flow 108 while passing through the boil-off heat exchanger 110.

Hereinafter, an operation of an apparatus for re-liquefaction of boil-off gas re-according to an embodiment of the present invention will be described with reference to FIG. 4. The present embodiment is particularly suitable for the case where the liquefied gas stored in the storage tank is liquefied natural gas and the fuel consumption place is X-DF, but is not limited thereto. The same goes for the fourth embodiment.

The gaseous boil-off gas generated from the storage tank (T) storing the liquefied gas in the liquid phase is supplied to the boil-off gas heat exchanger (110). At this time, the gaseous boil-off gas generated from the storage tank T meets the gaseous boil-off gas discharged from the gas-liquid separator 170 after the predetermined time elapses from the operation of the system to form the first flow 100. Ultimately, the boil-off gas supplied to the boil-off gas heat exchanger 110 becomes the first flow 100.

The boil-off gas heat exchanger 110 serves to recover the cold heat of the first flow 100 to cool the other boil-off gas. That is, the boil-off heat exchanger 110 recovers the cold heat of the first flow 100 and delivers the recovered cold heat to the flow supplied back to the boil-off heat exchanger 110 in the second flow 102, that is, the fourth flow 106.

Accordingly, in the boil-off heat exchanger 110, the heat exchange is generated between the first flow 100 and the fourth flow 106 so that the first flow 100 is heated and the fourth flow 106 is cooled. The heated first flow 100 becomes the second flow 102 and the cooled fourth flow 106 becomes the fifth flow 108.

The second flow 102 discharged from the boil-off gas heat exchanger 110 is supplied to the compressor 120 or the first extra compressor 122 and is compressed by the compressor 120 or the first extra compressor 122.

A part of the second flow 102 in which the boil-off gas compressed by the compressor 120 and the boil-off gas compressed by the first extra compressor 122 are joined is the third flow 104 and supplied to the refrigerant heat exchanger 140 as a refrigerant, and the other part thereof is the fourth flow 106 and is supplied to the boil-off gas heat exchanger 110 to be cooled and the remaining part thereof is supplied to the fuel consumption place 180.

The third flow 104 supplied to the refrigerant heat exchanger 140 is discharged from the refrigerant heat exchanger 140 and expanded in the refrigerant decompressing device 160 and then supplied back to the refrigerant heat exchanger 140. At this time, the third flow 104 primarily supplied to the refrigerant heat exchanger 140 is expanded in the refrigerant heat exchanger 140 and then exchanges heat with the third flow 104 supplied back to the refrigerant heat exchanger 140 to be cooled. The third flow 104 which passes through the refrigerant decompressing device 160 and the refrigerant heat exchanger 140 is joined with the second flow 102 that is discharged from the boil-off gas heat exchanger 110 and supplied to the compressor 120 or the first extra compressor 122.

The fourth flow 106 cooled by the heat exchange with the first flow 100 in the boil-off gas heat exchanger 110 becomes the fifth flow 108 and is supplied to the refrigerant heat exchanger 140. The fifth flow 108 supplied to the refrigerant heat exchanger 140 exchanges heat with the third flow 104 which passes through the refrigerant decompressing device 160 and is cooled, and then passes through the first decompressing device 150 and expanded. The fifth flow 108 which passes through the first decompressing device 150 becomes a gas-liquid mixture state in which gas and liquid are mixed.

The fifth flow 108 in the gas-liquid mixture state is immediately sent to the storage tank T or separated into gas and liquid while passing through the gas-liquid separator 170. The liquid separated by the gas-liquid separator 170 is supplied to the storage tank T and the gas separated by the gas-liquid separator 170 is supplied back to the boil-off gas heat exchanger 110, thereby repeating the above-mentioned series of processes.

FIG. 5 is a configuration diagram schematically showing a boil-off gas treatment system for a ship according to a fourth embodiment of the present invention.

The ship of the fourth embodiment shown in FIG. 5 is different from the ship of the third embodiment shown in FIG. 4 in that the ship of the fourth embodiment further includes a third supply line L7 along which a part of the boil-off gas passing through the boil-off gas heat exchanger 112 along the return line L3 is branched to be sent back to the boil-off gas heat exchanger 112 to increase the re-liquefaction efficiency and the re-liquefaction amount in the boil-off gas heat exchanger 112, further includes a ninth valve 201, a first additional line L6, a tenth valve 202, and a thirteenth valve 205, and a system is configured to modify some lines in which the boil-off gas flows to operate the refrigerant cycle as the closed loop as in the first embodiment and the second embodiment and operate the refrigerant cycle as the closed loop as in the third embodiment. Hereinafter the difference will be mostly described. The detailed description of the same member as the ship of the foregoing third embodiment will be omitted.

In addition, the fuel consumption places 180 and 181 of the present embodiment are configured to correspond to the fuel consumption place 180 of the fourth embodiment. However, to differentiate the fuel consumption place 180 using the high-pressure boil-off gas as fuel from the fuel consumption place 181 using the low-pressure boil-off gas as fuel, the fuel consumption place using the high-pressure boil-off gas as fuel is referred to as a high pressure engine 180 and the fuel consumption place using the low-pressure boil-off gas is referred to a low-pressure engine 181.

The 'high pressure' of the high pressure engine 180 means that it uses a higher pressure fuel than the low pressure engine 181 and may be an X-DF engine as well as an ME-GI engine, which is generally classified as a high pressure engine. The low pressure engine 181 may be a DF engine or a gas turbine and the low pressure engine 181 may be the X-DF engine if the high pressure engine 180 is an ME-GI engine. Next, the above description is applied.

Referring to FIG. 5, similar to the third embodiment, the ship of the present embodiment includes the boil-off gas heat exchanger 112, the first valve 191, the compressor 120, the cooler 130, the second valve 192, the third valve 193, the extra compressor 122, the extra cooler 132, the fourth valve 194, the refrigerant heat exchanger 140, the refrigerant decompressing device 160, and the first decompressing device 150.

Similar to the third embodiment, the storage tank T stores liquefied gas such as liquefied natural gas and liquefied ethane gas, and discharges the boil-off gas to the outside when the internal pressure of the storage tank T exceeds a certain pressure or higher. The boil-off gas discharged from the storage tank (T) is sent to the boil-off gas heat exchanger 112.

Similar to the third embodiment, the boil-off gas heat exchanger 112 of the present embodiment uses the boil-off gas discharged from the storage tank T as the refrigerant and cools the boil-off gas supplied to the boil-off gas heat exchanger 112 along the return line L3.

However, the boil-off gas heat exchanger 112 of the present embodiment is different from the third embodiment in that the boil-off gas heat exchanger 112 uses as a refrigerant, the boil-off gas which passes through the boil-off gas heat exchanger 112 along the return line L3 and is then supplied along the third supply line L7 branched from the return line L3 as well as the boil-off gas discharged from the storage tank T along the return line L3 Therefore, the boil-off gas heat exchanger 112 of the present embodiment is a multiple heat exchanger.

The boil-off gas heat exchanger 112 recovers cold heat of the boil-off gas discharged from the storage tank T and cold heat of the boil-off gas supplied along the third supply line L7 and supplies the recovered cold heat to the boil-off gas sent to the boil-off gas heat exchanger 112 along the return line L3.

According to this embodiment, since not only the boil-off gas discharged from the storage tank T but also the boil-off gas supplied along the third supply line L7 is used as the refrigerant, the re-liquefaction efficiency and the re-liquefaction amount can more be increased than the third embodiment.

The present embodiment is particularly meaningful when the ship includes a plurality of engines having different fuel pressures required.

When the fuel pressure required by a plurality of engines mounted on the ship is different from each other, the boil-off gas discharged from the storage tank T is compressed with the pressure required by the high pressure engine 180 by the compressor 120 or the extra compressor 122 and a part of the boil-off gas compressed with the pressure required by the high pressure engine 180 is branched and decompressed and then sent to the low pressure engine 181. At this time, to send the fuel to the low pressure engine 181, the temperature of the boil-off gas is lowered while the boil-off gas is decompressed.

Accordingly, according to the present embodiment, the decompressed and cooled boil-off gas is not directly sent to the low pressure engine 181 but is supplied to the low pressure engine 181 via the boil-off gas heat exchanger 112, and the boil-off gas heat exchanger 112 may use the cold heat of the decompressed and cooled boil-off gas.

However, it should be noted that the compressor 120 or the extra compressor 122 of the present embodiment does not necessarily compress the boil-off gas only up to the pressure required by the high-pressure engine 180 but may compress the boil-off gas to a pressure higher than the pressure required by the high pressure engine 180 to increase the heat exchange efficiency in the heat exchanger 112 and the refrigerant heat exchanger 140. The boil-off gas compressed to a pressure higher than the pressure required by the high-pressure engine 180 may be supplied to the high pressure engine 180 after being decompressed up to the pressure required by the high-pressure engine 180 at the front end of the high pressure engine 180

A fifth valve 195 which controls the flow rate of the boil-off gas and the opening and closing may be installed on the return line L3 and a twelfth valve 204 which controls the flow rate of the boil-off gas and the opening and closing may be installed on the third supply line L7 on the upstream of the low pressure engine 181.

Similar to the third embodiment, the compressor 120 of the present embodiment is installed on the first supply line L1 to compress the boil-off gas discharged from the storage tank T and similar to the third embodiment, the extra compressor 122 of the present embodiment is installed in parallel with the compressor 120 on the second supply line L2 to compress the boil-off gas discharged from the storage tank T. The compressor 120 and the extra compressor 122 may be a compressor having the same performance, and each may be a multi-stage compressor.

Similar to the third embodiment, the ship of the present embodiment may further include an eleventh valve 203 which is installed on the upstream of the high-pressure engine 180 to control a flow rate of the boil-off gas sent to the high pressure engine 180 and the opening/closing thereof.

Similar to the third embodiment, the ship of the present embodiment uses the boil-off gas compressed by the extra compressor 122 as the refrigerant which additionally cools the boil-off gas in the refrigerant heat exchanger 140, thereby increasing the re-liquefaction efficiency and the re-liquefaction amount.

Similar to the third embodiment, the cooler 130 of the present embodiment is installed downstream of the compressor 120 to cool the boil-off gas that passes through the compressor 120 and has the increased pressure and temperature. Similar to the third embodiment, the extra cooler 132 of the present embodiment is installed downstream of the extra compressor 122 to cool the boil-off gas which passes through the extra compressor 122 and has the increased pressure and temperature.

Similar to the third embodiment, the refrigerant heat exchanger 140 of the present embodiment additionally cools the boil-off gas which is supplied to the boil-off gas heat exchanger 112 along the return line L3 and cooled by the boil-off gas heat exchanger 112.

Similar to the third embodiment, according to the present embodiment, the boil-off gas discharged from the storage tank T is further cooled not only in the boil-off gas heat exchanger 112 but also in the refrigerant heat exchanger 140, and may be supplied to the first decompressing device 150 in the state in which the temperature is lower, thereby increasing the re-liquefaction efficiency and the re-liquefaction amount. In addition, as described above, the boil-off gas is cooled by the cold heat of the boil-off gas sent from the boil-off gas heat exchanger 112 to the low pressure engine 181, thereby more increasing the re-liquefaction efficiency and the re-liquefaction amount than the third embodiment.

Similar to the third embodiment, the refrigerant decompressing device 160 of the present embodiment expands the boil-off gas which passes through the refrigerant heat exchanger 140, and then sends the expanded boil-off gas back to the refrigerant heat exchanger 140.

Similar to the third embodiment, the first decompressing device 150 of the present embodiment is installed on the return line L3 to expand the boil-off gas cooled by the boil-off gas heat exchanger 112 and the refrigerant heat exchanger 140. The first decompressing device 150 of the present embodiment includes all means which may expand and cool the boil-off gas, and may be an expansion valve, such as a Joule-Thomson valve, or an expander.

Similar to the third embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the third embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the boil-off gas heat exchanger 112 along a gas discharge line which extends from the gas-liquid separator 170 to the first supply line L1 on the upstream of the boil-off gas heat exchanger 112.

Similar to the third embodiment, when the ship of the present embodiment includes the gas-liquid separator 170, the ship may further include a seventh valve 197 which controls the flow rate of the liquid separated by the gas-liquid separator 170 and sent to the storage tank T; an eighth valve 198 which controls the flow rate of gas separated by the gas-liquid separator 170 and sent to the boil-off gas heat exchanger 112.

However, unlike the third embodiment, the ship of the present embodiment further includes: a third supply line L7 on which a part of the boil-off gas passing through the boil-off gas heat exchanger 112 along the return line L3 is branched and sent back to the boil-off gas heat exchanger 112; a third decompressing device 301 which is installed on the third supply line L7 to decompress the boil-off gas sent to the boil-off gas heat exchanger 112; a first additional line L6 which connects between the recirculation line L5 and the second supply line L2; a ninth valve 201 which is installed on the recirculation line L5; a tenth valve 202 which is installed on the first additional line L6; and a thirteenth valve 205 which is installed on the recirculation line L5 between the second supply line L2 and the refrigerant heat exchanger 140.

Unlike the third embodiment which selectively includes the sixth valve 196, the ship of the present embodiment essentially includes the sixth valve 196 which is installed on the recirculation line L5 along which the boil-off gas branched from the first supply line L1 is sent to the refrigerant heat exchanger 140 to control the flow rate of the boil-off gas and the opening/closing thereof.

The third supply line L7 of the present embodiment is branched from the return line L3 between the boil-off gas heat exchanger 112 and the refrigerant heat exchanger 140 and a part of the boil-off gas which is compressed by the compressor 120 or the extra compressor 122 and then passes through the boil-off gas heat exchanger 112 along the return line L3 is sent back to the boil-off gas heat exchanger 112. The boil-off gas sent to the boil-off gas heat exchanger 112 along the third supply line L7 is used as a refrigerant in the boil-off gas heat exchanger 112.

The third decompressing device 301 of the present embodiment is installed on the third supply line L7 on the upstream of the boil-off gas heat exchanger 112 and expands the partially branched boil-off gas of the boil-off gas which is cooled by the boil-off gas heat exchanger 112 and then returns to the refrigerant heat exchanger 140 along the return line L3. The boil-off gas expanded by the third decompressing device 301 has the lowered pressure and temperature.

The boil-off gas whose temperature is lowered by the third decompressing device 301 supplies the cold heat to the boil-off gas heat exchanger 112.

The third decompressing device 301 of the present embodiment includes all means which may expand and cool the boil-off gas, and may be an expansion valve, such as a Joule-Thomson valve, or an expander.

One side of the first additional line L6 of the present embodiment is connected to a recirculation line (not shown) which is expanded by the refrigerant decompressing device 160 and then sent to the first supply line L1 through the refrigerant heat exchanger 140 L5 and the other side thereof is connected to the second supply line L2 between the third valve 193 and the extra compressor 122.

The ninth valve 201 of the present embodiment is installed on the recirculation line L5 between the point where the recirculation line L5 meets the first supply line L1 on the upstream of the compressor 120 and the extra compressor 122 and the point where the recirculation line L5 meets the first additional line L6, thereby controlling the flow rate of the fluid and the opening/closing thereof.

In addition, the ship of the present embodiment is different from the third embodiment in that the second supply line L2 on the downstream of the extra compressor 122 is connected to the recirculation line L5 instead of the first supply line L1.

The first to thirteenth valves and the eleventh valve 191, 192, 193, 194, 195, 196, 197, 198, 201, 202, 203, 204, and 205 of the present embodiment may be manually controlled by allowing a person to directly determine the operation condition of the system and may be automatically controlled to be opened or closed depending on a preset value.

Unlike the third embodiment, according to the ship of the present embodiment, the refrigerant cycle may be operated not only as the open loop but also as the closed loop so as to more flexibly use the re-liquefaction system according to the operating conditions of the ship. Hereinafter, a method of operating a refrigerant cycle as the closed loop and a method of operating a refrigerant cycle as the open loop by a valve control will be described.

To operate the refrigerant cycle of the ship of the present embodiment as the closed loop, the system is operated while the first valve 191, the second valve 192, the third valve 193, the fourth valve 194, the tenth valve 202, and the thirteenth valve 205 are open, and the sixth valve 196 and the ninth valve 201 are closed.

If the boil-off gas which is discharged from the storage tank T and then compressed by the extra compressor 122 is supplied to the recirculation line L5, the third valve 193 is closed to form the refrigerant cycle of the closed loop in which the boil-off gas circulates the extra compressor 122, the extra cooler 132, the fourth valve 194, the thirteenth valve 205, the refrigerant heat exchanger 140, the refrigerant decompressing device 160, the refrigerant heat exchanger 140, and the tenth valve 202.

When the refrigerant cycle is configured as the closed loop, nitrogen gas may be used as the refrigerant circulating the closed loop. In this case, the ship of the present embodiment may further include the pipe through which the nitrogen gas is introduced into the refrigerant cycle of the closed loop.

When the refrigerant cycle is operated as the closed loop, only the boil-off gas circulating the closed loop is used as the refrigerant in the refrigerant heat exchanger 140. The boil-off gas passing through the compressor 120 is not introduced into the refrigerant cycle but is supplied to the high-pressure engine 180 or undergoes the re-liquefaction process along the return line L3. Therefore, a predetermined flow rate of boil-off gas is circulated as the refrigerant in the refrigerant heat exchanger 140 irrespective of the re-liquefaction amount or the amount of boil-off gas required by the high pressure engine 180.

The flow of the boil-off gas in the case where the refrigerant cycle of the ship of the present embodiment is operated as the closed loop will be described as follows.

The boil-off gas discharged from the storage tank T passes through the boil-off gas heat exchanger 112 and then compressed by the compressor 120, and a part thereof is cooled by the cooler 130 and then sent to the fuel consumption place 180, and the remaining part thereof is sent to the boil-off gas heat exchanger 112 along the return line L3. The boil-off gas sent to the boil-off gas heat exchanger 112 along the return line L3 exchanges heat with the boil-off gas discharged from the storage tank T and the boil-off gas supplied to the boil-off gas heat exchanger 112 through the third supply line L7 to be cooled, and then is branched into two flows.

One flow of the boil-off gases, which are cooled by the boil-off gas heat exchanger 112 and then branched into two flows, is continuously supplied to the refrigerant heat exchanger 140 along the return line L3 and heat-exchanged in the refrigerant heat exchanger 140 to be additionally cooled. The boil-off gas cooled by the boil-off gas heat exchanger 112 and the refrigerant heat exchanger 140 is expanded by the first decompressing device 150 and thus the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 112. The liquid separated by the gas-liquid separator 170 is supplied to the storage tank T.

The other flow of the boil-off gases, which are cooled by the boil-off gas heat exchanger 112 and then branched into two flows, is expanded by the third decompressing device 301 along the third supply line L7 and then expanded back to the boil-off gas heat exchanger 112. The boil-off gas, which is expanded by the third decompressing device 301 and has the lowered pressure and temperature, is used as the refrigerant in the boil-off gas heat exchanger 112. The boil-off gas used as the refrigerant in the boil-off gas heat exchanger 112 after passing through the third decompressing device 301 is supplied to the low pressure engine 181 along the third supply line L7.

Meanwhile, the boil-off gas circulating the refrigerant cycle is compressed by the extra compressor 122, cooled by the extra cooler 132, and then sent to the refrigerant heat exchanger 140 along the recirculation line L5. The boil-off gas which passes through the extra compressor 122 and the extra cooler 132 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 112 and then supplied to the refrigerant heat exchanger 140 along the return line L3 and the boil-off gas compressed by the extra compressor 122 and then supplied to the refrigerant heat exchanger 140 along the recirculation line L5. The boil-off gas which passes through the refrigerant decompressing device 160 and then used as the refrigerant in the refrigerant heat exchanger 140 is sent back to the extra compressor 122, thereby repeating the above-mentioned series of processes.

When the compressor 120 or the cooler 130 fails while the refrigerant cycle of the ship of the present embodiment is operated as the closed loop, the first valve 191, the second valve 192, and the tenth valve 202, and the thirteenth valve 205 are closed and the third valve 193 and the sixth valve 196 are open to allow the boil-off gas which is discharged from the storage tank T and then passes through the boil-off gas heat exchanger 112 to be supplied to the high pressure engine 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 and the thirteenth valve 205 may be open to operate the system.

To operate the refrigerant cycle of the ship of the present embodiment as the open loop, the first valve 191, the second valve 192, the third valve 193, the fourth valve 194, the sixth valve 196, the ninth valve 201, and the thirteenth valve 205 are open, and the tenth valve 202 are closed.

When the refrigerant cycle is operated as the closed loop, the boil-off gas circulating the refrigerant cycle and the boil-off gas sent to the high pressure engine 180 or undergoing the re-liquefaction process along the return line L3 are separated. On the other hand, when the refrigerant cycle is operated as the open loop, the boil-off gas compressed by the compressor 120 and the boil-off gas compressed by the extra compressor 122 are joined to be used as a refrigerant in the refrigerant heat exchanger 140, to be sent to the high pressure engine 180, or to undergo the re-liquefying process along the return line L3.

Therefore, if the refrigerant cycle is operated as the open loop, the flow rate of the refrigerant to be sent to the refrigerant heat exchanger 140 may be flexibly controlled in consideration of the re-liquefaction amount and the amount of boil-off gas required by the high pressure engine 180. In particular, when the amount of boil-off gas required by the high pressure engine 180 is small, increasing the flow rate of the refrigerant sent to the refrigerant heat exchanger 140 may increase the re-liquefaction efficiency and the re-liquefaction amount.

That is, when the refrigerant cycle is operated as the closed loop, it is not possible to supply the refrigerant heat exchanger 140 with the boil-off gas equal to or more than the capacity of the extra compressor 122. However, when the refrigerant cycle is operated as the open loop, the boil-off gas having a flow rate exceeding the capacity of the extra compressor 122 may be supplied to the refrigerant heat exchanger 140.

The flow of the boil-off gas in the case where the refrigerant cycle of the ship of the present embodiment is operated as the open loop will be described as follows.

The boil-off gas discharged from the storage tank T is branched into two flows after passing through the boil-off gas heat exchanger 112 and a part thereof is sent to the first supply line L1 and the remaining part thereof is supplied to the second supply line L2.

The boil-off gas sent to the first supply line L1 passes through the first valve 191, the compressor 120, the cooler 130, and the second valve 192 and then a part thereof passes through the sixth valve 196 and the thirteenth valve 205 and is sent to the refrigerant heat exchanger 140, and the other part thereof is again branched into two flows. One flow of the boil-off gases branched into the two flows is sent to the high pressure engine 180 and the other thereof is sent to the boil-off gas heat exchanger 112 along the return line L3.

The boil-off gas sent to the second supply line L1 passes through the third valve 193, the extra compressor 122, the extra cooler 132, and the fourth valve 194 and then a part thereof is sent to the refrigerant heat exchanger 140 via the thirteenth valve 205 and the other part thereof is sent to the first supply line L1 and then branched into two flows. One flow of the boil-off gases branched into the two flows is sent to the high pressure engine 180 and the other flow thereof is sent to the boil-off gas heat exchanger 112 along the return line L3.

For convenience of explanation, the boil-off gas compressed by the compressor 120 and the boil-off gas compressed by the extra compressor 122 are separately described. However, each of the boil-off gas compressed by the compressor 120 and the boil-off gas compressed by the extra compressor 122 does not flow separately but is joined to be supplied to the refrigerant heat exchanger 140, the high pressure engine 180, or the boil-off gas heat exchanger 112.

That is, the boil-off gas compressed by the compressor 120 and the boil-off gas compressed by the extra compressor 122 are mixed, which in turn flows in the recirculation line L5 along which the boil-off gas is sent to the refrigerant heat exchanger 140, the first supply line L1 along which the boil-off gas is sent to the high pressure engine 180, and the return line along which the boil-off gas is sent to the boil-off gas heat exchanger 112.

The boil-off gas sent to the refrigerant heat exchanger 140 along the recirculation line L5 is primarily heat-exchanged in the refrigerant heat exchanger 140 to be cooled, and secondarily expanded by the refrigerant decompressing device 160 to be cooled and supplied back to the refrigerant heat exchanger 140. The boil-off gas which passes through the refrigerant decompressing device 160 and is then supplied to the refrigerant heat exchanger 140 is used as the refrigerant which cools both of the boil-off gas passing through the boil-off gas heat exchanger 112 and then supplied to the refrigerant heat exchanger 140 along the return line L3 and the confluent flow of the boil-off gas compressed by the compressor 120 and the boil-off gas compressed by the extra compressor 122 which are supplied to the refrigerant heat exchanger 140 along the recirculation line L5.

That is, the boil-off gas used as the refrigerant in the refrigerant heat exchanger 140 is supplied to the refrigerant heat exchanger 140 along the recirculation line L5, and then primarily cooled by the refrigerant heat exchanger 140 and secondarily cooled by the refrigerant decompressing device 160. In addition, the boil-off gas sent from the compressor 120 or the extra compressor 122 to the refrigerant heat exchanger 140 along the recirculation line L5 is primarily cooled by the boil-off gas, which passes through the refrigerant decompressing device 160, as the refrigerant.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 112, thereby repeating the above-mentioned series of processes.

Meanwhile, the boil-off gas sent to the heat exchanger 112 along the return line L3 is cooled by the boil-off gas heat exchanger 112 and then branched into two flows.

One flow of the boil-off gases, which are cooled by the boil-off gas heat exchanger 112 and then branched into two flows, is continuously supplied to the refrigerant heat exchanger 140 along the return line L3 and heat-exchanged in the refrigerant heat exchanger 140 to be additionally cooled. The boil-off gas cooled by the boil-off gas heat exchanger 112 and the refrigerant heat exchanger 140 is expanded by the first decompressing device 150 and thus the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 112. The liquid separated by the gas-liquid separator 170 is supplied to the storage tank T.

The other stream of the boil-off gases, which are cooled by the boil-off gas heat exchanger 112 and then branched into two flows, is expanded by the third decompressing device 301 along the third supply line L7 and then expanded back to the boil-off gas heat exchanger 112. The boil-off gas, which is expanded by the third decompressing device 301 and has the lowered pressure and temperature, is used as the refrigerant in the boil-off gas heat exchanger 112. The boil-off gas used as the refrigerant in the boil-off gas heat exchanger 112 after passing through the third decompressing device 301 is supplied to the low pressure engine 181 along the third supply line L7.

When the compressor 120 or the cooler 130 fails while the refrigerant cycle of the ship of the present embodiment is operated as the open loop, the first valve 191, the second valve 192, the ninth valve 201, and the thirteenth valve 205 are closed to allow the boil-off gas which is discharged from the storage tank T and then passes through the boil-off gas heat exchanger 112 to be supplied to the high pressure engine 180 via the third valve 193, the extra compressor 122, the extra cooler 132, the fourth valve 194, the sixth valve 196. When it is necessary to use the boil-off gas compressed by the extra compressor 122 as the refrigerant of the refrigerant heat exchanger 140, the ninth valve 201 and the thirteenth valve 205 may be open to operate the system.

When the refrigerant cycle of the ship of the present embodiment is operated as the open loop and the liquefied gas stored in the storage tank T is liquefied natural gas and the high pressure engine 180 is the X-DF engine and the low pressure engine 181 is the DF engine, the compressor 120 and the extra compressor 122 each compress the boil-off gas to approximately 17 bars which is the pressure required by the high pressure engine 180.

The boil-off gas at point A in FIG. 5, which is the confluent flow of the boil-off gas compressed by compressor 120 and the boil-off compressed by extra compressor 122, may be approximately 43° C. and 17 bars. The boil-off gas of approximately 43° C. and 17 bars may be cooled by the boil-off gas heat exchanger 112 to be approximately −110° C. and 17 bars (C in FIG. 5), and the boil-off gas of approximately −100° C. and 17 bars may be expanded by the third decompressing device 301 to be approximately −125° C. and 6.5 bars (D in FIG. 5).

The ship of the present embodiment may independently operate the extra compressor 122 and the compressor 120 while operating the refrigerant cycle as the open loop so that the boil-off gas compressed by the extra compressor 122 is used only as the refrigerant of the refrigerant heat exchanger 140, the boil-off gas compressed by the compressor 120 is sent to the high pressure engine 180 or undergoes the re-liquefaction process along the return line L3 and is not used as the refrigerant of the refrigerant heat exchanger 140. Hereinafter, the refrigerant cycle of the open loop in which the extra compressor 122 and the compressor 120 are operated independently is referred to as an 'independent open loop'.

To operate the refrigerant cycle of the ship of the present embodiment as the independent open loop, the first valve 191, the second valve 192, the third valve 193, the fourth valve 194, the ninth valve 201, and the thirteenth valve 205 are open, and the sixth valve 196 and the tenth valve 202 are closed. When the refrigerant cycle is operated as the independent open loop, the system can be operated more easily than when the open loop is operated.

The flow of the boil-off gas in the case where the refrigerant cycle of the ship of the present embodiment is operated as the independent open loop will be described as follows.

The boil-off gas discharged from the storage tank T is branched into two flows after passing through the boil-off gas heat exchanger 112 and a part thereof is sent to the first supply line L1 and the remaining part thereof is supplied to the second supply line L2. The boil-off gas sent to the first supply line L1 passes through the first valve 191, the compressor 120, the cooler 130, and the second valve 192 and then a part thereof is sent to the high pressure engine 180 and the other part thereof is sent to the boil-off gas heat exchanger 112 along the return line L3. The boil-off gas sent to the second supply line L2 passes through the third valve 193, the extra compressor 122, the extra cooler 132, the fourth valve 194, and the thirteenth valve 205 and is then sent to the refrigerant heat exchanger 140.

The boil-off gas which is compressed by the extra compressor 122 and then sent to the refrigerant heat exchanger 140 along the recirculation line L5 is used as the refrigerant which cools the boil-off gas which is primarily heat-exchanged in the refrigerant heat exchanger 140 to be cooled, secondarily expanded by the refrigerant decompressing device 160 to be cooled, and then supplied back to the refrigerant heat exchanger 140 to pass through the boil-off gas heat exchanger 112 and then be supplied to the refrigerant heat exchanger 140 via the return line L3 and the boil-off gas which is compressed by the extra compressor 122 and then supplied to the refrigerant heat exchanger 140 along the recirculation line L5.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 112, thereby repeating the above-mentioned series of processes.

Meanwhile, the boil-off gas, which is compressed by the compressor 120 and sent to the heat exchanger 112 along the return line L3, is cooled by the boil-off gas heat exchanger 112 and then branched into two flows.

One flow of the boil-off gases, which are cooled by the boil-off gas heat exchanger 112 and then branched into two flows, is continuously supplied to the refrigerant heat exchanger 140 along the return line L3 and heat-exchanged in the refrigerant heat exchanger 140 to be additionally cooled. The boil-off gas cooled by the boil-off gas heat exchanger 112 and the refrigerant heat exchanger 140 is expanded by the first decompressing device 150 and thus the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 112. The liquid separated by the gas-liquid separator 170 is supplied to the storage tank T.

The other stream of the boil-off gases, which are cooled by the boil-off gas heat exchanger 112 and then branched into two flows, is expanded by the third decompressing device 301 along the third supply line L7 and then expanded back to the boil-off gas heat exchanger 112. The boil-off gas, which is expanded by the third decompressing device 301 and has the lowered pressure and temperature, is used as the refrigerant in the boil-off gas heat exchanger 112. The boil-off gas used as the refrigerant in the boil-off gas heat exchanger 112 after passing through the third decompressing device 301 is supplied to the low pressure engine 181 along the third supply line L7.

When the compressor 120 or the cooler 130 fails while the refrigerant cycle of the ship of the present embodiment is operated as the independent closed loop, the first valve 191, the second valve 192, the ninth valve 201, and the thirteenth valve 205 are closed and the sixth valve 196 is open to allow the boil-off gas which is discharged from the storage tank T and then passes through the boil-off gas heat exchanger 112 to be supplied to the high pressure engine 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 and the thirteenth valve 205 may be open to operate the system.

FIG. 6 is a configuration diagram schematically showing a boil-off gas treatment system for a ship according to a fifth embodiment of the present invention.

The ship of the fifth embodiment shown in FIG. 6 is different from the ship of the fourth embodiment shown in FIG. 5 in that the ship further includes a boost compressor 124 which is installed on the return line L3; and a boost cooler 134 which is installed on the downstream of the boost compressor 124 to increase the re-liquefaction efficiency and the re-liquefaction amount in the boil-off gas heat exchanger 112 and the refrigerant heat exchanger 140. Hereinafter, the difference will be mostly described. The detailed description of the same member as the ship of the foregoing fourth embodiment will be omitted.

Referring to FIG. 6, similar to the fourth embodiment, the ship of the present embodiment includes the boil-off gas heat exchanger 112, the first valve 191, the compressor 120, the cooler 130, the second valve 192, the third valve 193, the extra compressor 122, the extra cooler 132, the fourth valve 194, the refrigerant heat exchanger 140, the refrigerant decompressing device 160, the first decompressing device 150, the third supply line L7, the ninth valve 201, the first additional line L6, the tenth valve 202, and the thirteenth valve 205.

Similar to the fourth embodiment, the storage tank T stores liquefied gas such as liquefied natural gas and liquefied ethane gas, and discharges the boil-off gas to the outside when the internal pressure of the storage tank T exceeds a certain pressure or higher. The boil-off gas discharged from the storage tank (T) is sent to the boil-off gas heat exchanger 112.

Similar to the fourth embodiment, the boil-off gas heat exchanger 112 of the present embodiment uses, as the refrigerant, the boil-off gas which is discharged from the storage tank T and the boil-off gas which is supplied along the third supply line L7 to cool the boil-off gas sent to the boil-off gas heat exchanger 112 along the return line L3. Therefore, the boil-off gas heat exchanger 112 is a multiple heat exchanger.

Similar to the fourth embodiment, a fifth valve 195 which controls the flow rate of the boil-off gas and the opening and closing may be installed on the return line L3 and a twelfth valve 204 which controls the flow rate of the boil-off gas and the opening and closing may be installed on the third supply line L7 on the upstream of the low pressure engine 181.

Similar to the fourth embodiment, according to the present embodiment, since not only the boil-off gas discharged from the storage tank T but also the boil-off gas supplied along the third supply line L7 is used as the refrigerant, the re-liquefaction efficiency and the re-liquefaction amount can more be increased than the third embodiment.

Similar to the fourth embodiment, the compressor 120 of the present embodiment is installed on the first supply line L1 to compress the boil-off gas discharged from the storage tank T and similar to the fourth embodiment, the extra compressor 122 of the present embodiment is installed in parallel with the compressor 120 on the second supply line L2 to compress the boil-off gas discharged from the storage tank T. The compressor 120 and the extra compressor 122 may be a compressor having the same performance, and each may be a multi-stage compressor.

Similar to the fourth embodiment, the compressor 120 and the extra compressor 122 of the present embodiment may compress the boil-off gas to a pressure required by the high pressure engine 180, compress the boil-off gas to a pressure higher than the pressure required by the high pressure engine 180, and the boil-off gas compressed to a pressure higher than the pressure required by the high pressure engine 180 may be decompressed to a pressure required by the high pressure engine 180 at the front end of the high pressure engine 180 and then supplied to the high pressure engine 180.

Similar to the fourth embodiment, the ship of the present embodiment may further include an eleventh valve 203 which is installed on the upstream of the high-pressure engine 180 to control a flow rate of the boil-off gas sent to the high pressure engine 180 and the opening/closing thereof.

Similar to the fourth embodiment, the ship of the present embodiment uses the boil-off gas compressed by the extra compressor 122 as the refrigerant which additionally cools the boil-off gas in the refrigerant heat exchanger 140, thereby increasing the re-liquefaction efficiency and the re-liquefaction amount.

Similar to the fourth embodiment, the cooler 130 of the present embodiment is installed downstream of the compressor 120 to cool the boil-off gas that passes through the compressor 120 and has the increased pressure and temperature. Similar to the fourth embodiment, the extra cooler 132 of the present embodiment is installed downstream of the extra compressor 122 to cool the boil-off gas which passes through the extra compressor 122 and has the increased pressure and temperature.

Similar to the fourth embodiment, the refrigerant heat exchanger 140 of the present embodiment additionally cools the boil-off gas which is supplied to the boil-off gas heat exchanger 112 along the return line L3 and cooled by the boil-off gas heat exchanger 112.

Similar to the fourth embodiment, according to the present embodiment, the boil-off gas discharged from the storage tank T is further cooled not only in the boil-off gas heat exchanger 112 but also in the refrigerant heat exchanger 140, and may be supplied to the first decompressing device 150 in the state in which the temperature is lower, thereby increasing the re-liquefaction efficiency and the re-liquefaction amount.

Similar to the fourth embodiment, the refrigerant decompressing device 160 of the present embodiment expands the boil-off gas which passes through the refrigerant heat exchanger 140, and then sends the expanded boil-off gas back to the refrigerant heat exchanger 140.

Similar to the fourth embodiment, the first decompressing device 150 of the present embodiment is installed on the return line L3 to expand the boil-off gas cooled by the boil-off gas heat exchanger 112 and the refrigerant heat exchanger 140. The first decompressing device 150 of the present embodiment includes all means which may expand and cool the boil-off gas, and may be an expansion valve, such as a Joule-Thomson valve, or an expander.

Similar to the fourth embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the fourth embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the boil-off gas heat exchanger 112 along a gas discharge line which extends from the gas-liquid separator 170 to the first supply line L1 on the upstream of the boil-off gas heat exchanger 112.

Similar to the fourth embodiment, when the ship of the present embodiment includes the gas-liquid separator 170, the ship may further include a seventh valve 197 which controls the flow rate of the liquid separated by the gas-liquid separator 170 and sent to the storage tank T; an eighth valve 198 which controls the flow rate of gas separated by the gas-liquid separator 170 and sent to the boil-off gas heat exchanger 112.

Similar to the fourth embodiment, the third supply line L7 of the present embodiment is branched from the return line L3 between the boil-off gas heat exchanger 112 and the refrigerant heat exchanger 140 and a part of the boil-off gas which is compressed by the compressor 120 or the extra compressor 122 and then passes through the boil-off gas heat exchanger 112 along the return line L3 is sent back to the boil-off gas heat exchanger 112. The boil-off gas sent to the boil-off gas heat exchanger 112 along the third supply line L7 is used as a refrigerant in the boil-off gas heat exchanger 112.

Similar to the fourth embodiment, the third decompressing device 301 of the present embodiment is installed on the third supply line L7 on the upstream of the boil-off gas heat exchanger 112 and expands a part of the boil-off gas which is cooled by the boil-off gas heat exchanger 112 and then sent to the refrigerant heat exchanger 140 along the return line L3.

Similar to the fourth embodiment, the third decompressing device 301 of the present embodiment includes all means which may expand and cool the boil-off gas, and may be an expansion valve, such as a Joule-Thomson valve, or an expander.

Similar to the fourth embodiment, one side of the first additional line L6 of the present embodiment is connected to a recirculation line (not shown) which is expanded by the refrigerant decompressing device 160 and then sent to the first supply line L1 through the refrigerant heat exchanger 140 L5 and the other side thereof is connected to the second supply line L2 between the third valve 193 and the extra compressor 122.

Similar to the fourth embodiment, the ninth valve 201 of the present embodiment is installed on the recirculation line L5 between the point where the recirculation line L5 meets the first supply line L1 on the upstream of the compressor 120 and the extra compressor 122 and the point where the recirculation line L5 meets the first additional line L6, thereby controlling the flow rate of the fluid and the opening/closing thereof.

Similar to the fourth embodiment, the tenth valve 202 of the present embodiment is installed on the first additional line L6 to control the flow rate of the fluid and the opening and closing thereof, and similar to the fourth embodiment, the thirteenth valve 205 of the present embodiment is installed on the recirculation line L5 between the second supply line L2 and the refrigerant heat exchanger 140 to control the flow rate of the fluid and the opening and closing thereof.

Similar to the fourth embodiment, the first to thirteenth valves and the eleventh valve 191, 192, 193, 194, 195, 196, 197, 198, 201, 202, 203, 204, and 205 of the present embodiment may be manually controlled by allowing a person to directly determine the operation condition of the system and may be automatically controlled to be opened or closed depending on a preset value.

However, similar to the fourth embodiment, the ship of the present embodiment is different from the third embodiment in that the ship further includes the boost compressor 124 which is installed on the return line L3 and the boost cooler 134 which is installed on the return line L3 on the downstream of the boost compressor 124.

The boost compressor 124 of the present embodiment is installed on the return line L3 on which a part of the boil-off gas supplied to the high pressure engine 180 along the first supply line L1 is branched to be sent to the boil-off gas heat exchanger 112, thereby increasing the pressure of the boil-off gas supplied to the boil-off gas heat exchanger 112 along the return line L3. The boost compressor 124 may compress the boil-off gas to the pressure equal to or lower than a critical point (in the case of methane, approximately 55 bars) or a pressure exceeding the critical point, and the boost compressor 124 of the present embodiment may compress the boil-off gas to approximately 300 bars if the boil-off gas is compressed to a pressure equal to or higher than the critical point.

The boost cooler 134 of the present embodiment is installed on the return line L3 on the downstream of the boost compressor 124 to lower the boil-off gas which passes through the boost compressor 124 and has not only the reduced pressure but also the increased temperature.

The ship of the present embodiment further includes the boost compressor 124 to increase the pressure of the boil-off gas undergoing the re-liquefaction process, thereby increasing the re-liquefaction efficiency and the re-liquefaction amount.

FIGS. 8A and 8B are graphs showing temperature values of methane depending on a heat flow under different pressures. Referring to FIGS. 8A and 8B, it can be appreciated that the higher the pressure of the boil-off gas undergoing the re-liquefaction process, the higher the self-heat exchange efficiency becomes. The 'self-' of the self-heat exchange means the heat exchange with the high-temperature boil-off gas by the low-temperature boil-off gas itself as the cooling fluid.

FIG. 8A shows the state of each fluid in the refrigerant heat exchanger 140 when the boost compressor 124 and the boost cooler 134 are not included, and FIG. 8B shows the state of each fluid in the refrigerant heat exchanger 124 when the boost compressor 124 and the boost cooler 134 are included.

Graph I at the uppermost side in FIGS. 10A and 10B shows the fluid state at point F in FIGS. 5 and 6 to which the refrigerant heat exchanger 140 is supplied along the recirculation line L5, graph L at the lowest side shows the fluid state of point G in FIGS. 5 and 6 which is supplied back to the refrigerant heat exchanger 140 to be used as the refrigerant after passing through the refrigerant heat exchanger 140 and the refrigerant decompressing device 160 along the recirculation line L5, and graph J overlapping with graph K of an intermediate part shows the fluid state at point C in FIGS. 5 and 6 which is supplied to the refrigerant heat exchanger 140 along the return line L3 after passing through the boil-off heat exchanger 112.

Since the fluid used as the refrigerant is deprived of the cold heat during the heat exchange process and the temperature thereof is gradually increased, the graph L proceeds from the left to the right as time passes, and since the fluid cooled by the heat exchange with the refrigerant is supplied with the cold heat from the refrigerant during the heat exchange process and the temperature thereof is reduced, the graphs I and J proceed from the right to the left as time passes.

The graph K at the intermediate part of FIGS. 8A and 8B is shown by a combination of the graph I and the graph J. That is, the fluid used as the refrigerant in the refrigerant heat exchanger 140 is drawn by the graph L, and the fluid cooled by the heat exchange with the refrigerant in the refrigerant heat exchanger 140 is drawn by the graph K.

The heat exchanger is designed so that the temperature and the heat flow of the fluid supplied (i.e., the points F, G, and C in FIG. 5) to the heat exchanger may be fixed, the temperature of the fluid used as the refrigerant may not be higher than the temperature of the fluid to be cooled (i.e., graphs L and K intersect each other so that the graph L does not show above the graph K), and a logarithmic mean temperature difference (LMTD) may be as small as possible.

The logarithmic mean temperature difference (LMTD) is a value represented by when in the case of a countercurrent flow which a heat exchanger manner in which the high-temperature fluid and the low-temperature fluid are injected in an opposite direction to each other and discharged from an opposite side from each other, the temperature before the low-temperature fluid passes through the heat exchanger is tc1, the temperature after the low-temperature fluid passes through the heat exchanger is tc2, the temperature before the high-temperature fluid passes through the heat exchanger is th1, the temperature after the high-temperature fluid passes through the heat exchanger is th2, and d1=th2-tc1 and d2=th1-tc2. The smaller the logarithmic mean temperature difference, the higher the efficiency of the heat exchanger.

On the graph, the logarithmic mean temperature difference (LMTD) is represented by an interval between the low-temperature fluid (graph L in FIG. 8) used as the refrigerant and the high-temperature fluid (graph K in FIG. 8) cooled by the heat exchange with the coolant. Here, it can be appreciated that the interval between the graph L and the graph K shown in FIG. 8B is narrower than the interval between the graph L and the graph K shown in FIG. 8A.

The difference appears because an initial value of the graph J, which is a point represented by a round circle, that is, the pressure (FIG. 8B) of the point C in FIG. 6 which passes through the boil-off gas heat exchanger 112 and is then supplied to the refrigerant heat exchanger 140 along the return line L3 is higher than the pressure (FIG. 8B) of the fluid of C point in FIG. 5.

That is, if the heat exchanger is designed so that the logarithmic mean temperature difference (LMTD) may be minimized under a certain initial condition, in the case of FIG. 8B in which the pressure of the boil-off gas (point C in FIG. 6) undergoing the re-liquefaction process is high, the efficiency of the heat exchanger is further increased, and as a result, the liquefaction amount and the liquefaction efficiency of the entire system are increased.

According to the present embodiment, it can be appreciated that if the pressure of the boil-off gas undergoing the re-liquefaction process, including the boost compressor 124 is increased, the larger amount of boil-off gas may be re-liquefied even if a smaller amount of refrigerant is used.

As described, since the ship of the present embodiment includes the boost compressor 124, it is possible to increase the re-liquefaction amount and the re-liquefaction efficiency, and since the case in which the boil-off gas can be completely treated without operating the extra compressor 122 by increasing the re-liquefaction amount and the re-liquefaction efficiency, the use frequency of the extra compressor can be reduced.

Although the re-liquefaction efficiency can be increased by using the extra compressor 122, the longer the time to operate the extra compressor 122, the weaker the redundancy concept for preparing for the failure of the compressor 120. The ship of the present embodiment can reduce the use frequency of the extra compressor 122 including the boost compressor 124, and therefore the redundancy concept can be sufficiently secured.

In addition, since the boost compressor 124 is generally sufficient to have approximately one half capacity of the compressor 120 or the extra compressor 122, the operation cost may be more saved in the case in which the system is operated by operating only the boost compressor 124 and the compressor 120 without operating the extra compressor 122 than in the case in which the system is operated only by the compressor 120 and the extra compressor 122 without the installation of the boost compressor 124.

Similar to the fourth embodiment, the ship of the present embodiment may operate the refrigerant cycle not only as the open loop but also operate as the closed loop, and a method of operating a refrigerant cycle as a closed loop, an open loop, and an independent open loop by a valve control is similar to the fourth embodiment.

When the refrigerant cycle of the ship of the present embodiment is operated as the open loop and the liquefied gas stored in the storage tank T is liquefied natural gas and the high pressure engine 180 is the X-DF engine and the low pressure engine 181 is the DF engine, the compressor 120 and the extra compressor 122 each compress the boil-off gas to approximately 17 bars which is the pressure required by the high pressure engine 180.

The boil-off gas at point A in FIG. 6, which is the confluent flow of the boil-off gas compressed by compressor 120 and the boil-off compressed by extra compressor 122, may be approximately 43° C. and 17 bars. The boil-off gas of approximately 43° C. and 17 bars, may be compressed to be approximately 43° C. and 300 bars after being compressed by the boost compressor 124 and cooled by the boost cooler 134 (B in FIG. 6).

The boil-off gas of approximately 43° C. and 300 bars may be cooled by the boil-off gas heat exchanger 112 to be approximately −110° C. and 300 bars (C in FIG. 6), and the boil-off gas of approximately −100° C. and 300 bars may be expanded by the third decompressing device 301 to be approximately −140° C. and 6.5 bars (D in FIG. 6).

When the boost compressor 124 compresses the boil-off gas to approximately 300 bars, there is an effect that the re-liquefaction amount is increased by approximately 10% as compared with the fourth embodiment The present invention is not limited to the above exemplary embodiments and therefore it is apparent to a person with ordinary skill in the art to which the present invention pertains that the exemplary embodiments of the present invention may be various modified or changed without departing from the technical subjects of the present invention.

The invention claimed is:

1. A ship comprising:
a storage tank configured to store liquefied gas (LNG);
a first engine configured to consume LNG at a first pressure;
a second engine configured to consume LNG at a second pressure lower than the first pressure;
a boil-off gas supply line configured to discharge boil-off gas from the storage tank;
at least two compressors installed in parallel to each other and downstream the boil-off gas supply line, wherein the at least two compressors are configured to receive boil-off gas discharged from the storage tank and to compress the boil-off gas to provide compressed boil-off gas;
a splitter comprising two or more valves and configured to receive the compressed boil-off gas from the at least two compressors and to split the compressed boil-off gas into at least three flows of the compressed boil-off gas;
a first line configured to receive a first flow of the at least three flows of the compressed boil-off gas and to process the first flow of the compressed boil-off gas for returning to the at least two compressors;
a second line configured to receive a second flow of the at least three flows of the compressed boil-off gas and to process the second flow of the compressed boil-off gas for returning to the storage tank;
a third line configured to send a third flow of the at least three flows of the compressed boil-off gas to the first engine;
a first heat exchanger configured to cool the second flow of the compressed boil-off gas with the boil-off gas discharged from the storage tank;
a first expander installed on the first line and configured to expand and cool the first flow of the compressed boil-off gas flowing through the first line;
a second heat exchanger configured to cool the second flow of the compressed boil-off gas flowing downstream the first heat exchanger with the first flow of the compressed boil-off gas that has been cooled at the first expander;

a second expander installed on the second line downstream the second heat exchanger and configured to expand the second flow of the compressed boil-off gas that has been cooled at the second heat exchanger to cause liquefaction of at least part of the second flow; and a fourth line branched off the second line at a branch-off point downstream the first heat exchanger and configured to send a portion of the second flow as a fourth flow toward the second engine; and a third expander installed on the fourth line and configured to expand and cool the fourth flow in the fourth line, wherein the fourth line downstream the third expander passes through the first heat exchanger such that the fourth flow heat exchanges with the second flow upstream the branch-off point in addition to the boil-off gas discharged from the storage tank, wherein the third expander is configured such that pressure of the fourth flow is adjusted for supplying the fourth flow to the second engine downstream the first heat exchanger and further such that the fourth flow downstream the third expander cools the second flow upstream the branch-off point along with the boil-off gas discharged from the storage tank.

2. The ship of claim 1, wherein the first pressure is in a range between 10 bars and 100 bars.

3. The ship of claim 2, wherein the at least two compressors are configured to compress the boil-off gas from the storage tank to a pressure between 10 bars and 100 bars.

4. The ship of claim 2, wherein the second engine is a dual fuel diesel electric (DFDE) engine.

5. The ship of claim 2, wherein the second pressure is about 6.5 bars.

6. The ship of claim 2, further comprising a boost compressor installed on the second line upstream the first heat exchanger and configured to further compress the second flow of the compressed boil-off gas to a pressure greater than 100 bars.

7. The ship of claim 1, wherein the first pressure is in a range between 150 bars and 400 bars.

8. The ship of claim 7, wherein the at least two compressors are configured to compress the boil-off gas from the storage tank to a pressure between 150 bars and 400 bars.

9. The ship of claim 1, wherein the two or more valves of the splitter are configured to control distribution of the compressed boil-off gas between the first flow and the second flow based on a flow rate of the boil-off gas discharged from the storage tank and a flow rate of the third flow to the engine.

* * * * *